United States Patent
Fujii et al.

(10) Patent No.: US 9,033,484 B2
(45) Date of Patent: May 19, 2015

(54) INKJET TREATMENT LIQUID AND INKJET RECORDING APPARATUS

(75) Inventors: Hidetoshi Fujii, Kanagawa (JP); Hiroshi Gotou, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 397 days.

(21) Appl. No.: 13/581,447

(22) PCT Filed: Feb. 23, 2011

(86) PCT No.: PCT/JP2011/054669
§ 371 (c)(1),
(2), (4) Date: Aug. 27, 2012

(87) PCT Pub. No.: WO2011/105613
PCT Pub. Date: Sep. 1, 2011

(65) Prior Publication Data
US 2012/0320137 A1    Dec. 20, 2012

(30) Foreign Application Priority Data
Feb. 26, 2010 (JP) .................... 2010-042026

(51) Int. Cl.
*B41J 2/01*     (2006.01)
*B41M 5/00*     (2006.01)
(Continued)

(52) U.S. Cl.
CPC ............ *B41M 5/0017* (2013.01); *B41J 2/2107* (2013.01); *B41J 2/2114* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ........... 347/100, 95, 101, 102, 103, 96, 99, 9, 347/20, 21; 106/31.6, 31.27, 31.13; 523/160, 161
See application file for complete search history.

(56) References Cited

U.S. PATENT DOCUMENTS 7,033,013 B2 * 4/2006 Koyano et al. ................. 347/100
2003/0144365 A1 * 7/2003 Schwartz et al. .............. 516/132
(Continued)

FOREIGN PATENT DOCUMENTS

JP    2002-096453     4/2002
JP    2002-103583     4/2002
(Continued)

OTHER PUBLICATIONS

International Search Report Issued May 10, 2011 in PCT/JP11/54669 Filed Feb. 23, 2011.

*Primary Examiner* — Manish S Shah
(74) *Attorney, Agent, or Firm* — Oblon, McClelland, Maier & Neustadt, L.L.P.

(57) ABSTRACT

An inkjet treatment liquid including: a water-soluble coagulating agent; a water-soluble organic solvent; a fluorochemical surfactant; a foam inhibitor; and water, wherein the foam inhibitor is a compound represented by General Formula (I), and the fluorochemical surfactant contains a compound represented by General Formula (II): $HOR_1R_3C—[CH_2]_n—CR_2R_4OH$ General Formula (I) in General Formula (I), $R_1$ and $R_2$ each denote an alkyl group having 3 to 6 carbon atoms; $R_3$ and $R_4$ each denote an alkyl group having 1 to 2 carbon atoms; and n denotes an integer of 1 to 6; and Rf-Q-Z General Formula (II) in General Formula (II), Rf denotes a perfluoroalkyl group; Q denotes a bonding group; and Z denotes a hydrophilic group containing $—(CH_2CH_2O)_n—$, $—COO^-$, $—SO_3^-$, $—SO_4^-$, or $—PO_4^-$; and n denotes an integer of 1 to 50.

9 Claims, 1 Drawing Sheet

(51) Int. Cl.
  *B41J 2/21*  (2006.01)
  *B41J 2/165*  (2006.01)
  *C08K 5/02*  (2006.01)
  *C08K 5/05*  (2006.01)
  *C08K 5/06*  (2006.01)
  *C08K 5/10*  (2006.01)

(52) U.S. Cl.
  CPC ............... *B41J2/16552* (2013.01); *C08K 5/02* (2013.01); *C08K 5/05* (2013.01); *C08K 5/06* (2013.01); *C08K 5/10* (2013.01)

(56) References Cited

U.S. PATENT DOCUMENTS

| | | |
|---|---|---|
| 2007/0197685 A1 | 8/2007 | Aruga et al. |
| 2008/0233363 A1 | 9/2008 | Goto |
| 2008/0248260 A1* | 10/2008 | Kojima et al. ............... 347/100 |
| 2009/0043028 A1 | 2/2009 | Matsuyama et al. |
| 2009/0098312 A1 | 4/2009 | Goto et al. |
| 2009/0176070 A1 | 7/2009 | Goto et al. |
| 2010/0196601 A1 | 8/2010 | Goto et al. |
| 2010/0196602 A1 | 8/2010 | Koyano et al. |
| 2011/0318543 A1* | 12/2011 | Goto ............................. 347/96 |

FOREIGN PATENT DOCUMENTS

| | | |
|---|---|---|
| JP | 2003-205605 | 7/2003 |
| JP | 2004-142291 | 5/2004 |
| JP | 2004-330569 | 11/2004 |
| JP | 2007-276387 | 10/2007 |
| JP | 2008-260307 | 10/2008 |
| JP | 2009-166387 | 7/2009 |
| WO | 2009/091079 A1 | 7/2009 |
| WO | WO 2009091079 A1 * | 7/2009 ................. B41J 2/01 |

* cited by examiner

INKJET TREATMENT LIQUID AND INKJET RECORDING APPARATUS

TECHNICAL FIELD

The present invention relates to an inkjet treatment liquid for improving image quality, and an inkjet recording apparatus including a treatment liquid application unit configured to apply the inkjet treatment liquid.

BACKGROUND ART

An inkjet recording method has become rapidly popular in these days because it can record color images on plain paper and its running cost is low. However, the inkjet recording method has problems that image defects typified by character feathering (hereinafter, referred to as feathering) easily occur depending on the combination of an ink with a recording medium used, causing significant degradation in image quality. Thus, an attempt has been made such that ink permeability is suppressed so as to prevent feathering. However, in this case, since the drying properties of an ink degrade, hands are stained by the ink of a recorded matter and an image smear occurs.

When a color image is recorded by the inkjet recording method, different color inks are sequentially superimposed one another. As a result, color inks bleed and are mixed together at the boundary parts of colors (hereinafter, referred to as color bleeding), and image quality significantly degrades. To solve these problems, attempts have been made to prevent the color bleeding by increasing ink permeability. However, in this case, since a colorant penetrates inside the recording medium, image density degrades, and ink significantly strikes through to the back surface of the recording medium, failing to perform double face printing in a suitable manner.

To solve these problems and improve image quality, image forming methods using a treatment liquid and an ink have been proposed. However, improvement in image quality using the treatment liquid causes decrease in the drying properties of an image and increase in smear. Unevenness of image improvement effect causes uneven density of an image.

In order to uniformly apply a treatment liquid to a recording medium, the following methods have been considered: a method of ejecting a treatment liquid from a head so as to apply the treatment liquid to a recording medium (see PTL 1); a method of atomizing a treatment liquid by air pressure (see PTL 2); and a method of uniformly applying a treatment liquid to a recording medium by controlling a pressure of a coating roller and an opposing roller (see PTL 3).

However, in the method of ejecting a treatment liquid from a head so as to apply the treatment liquid to a recording medium, in order to stably jet the treatment liquid, the viscosity and surface tension of the liquid are restricted. Additionally, the diameter of a nozzle and a liquid composition are restricted so as not to clog the nozzle, causing significant decrease in flexibility. Since in the case where the small amount of the treatment liquid is applied to a recording medium, in an area to which liquid droplets adhere spaces are formed between the adhered liquid droplets, causing nonuniform coating, it is necessary to increase the amount of the treatment liquid to be applied. However, in the case where the amount of the treatment liquid to be applied is increased, the drying properties degrades. In the method of atomizing a treatment liquid by air pressure, it is necessary to provide a space for atomization, and an apparatus cannot be downsized. Moreover, since the amount of the treatment liquid which is not applied to a medium is larger than the amount of the treatment liquid applied to the medium, there are problems on cost and environment. In the method of uniformly applying a treatment liquid to a recording medium by controlling a pressure of a coating roller and an opposing roller, it is impossible to completely prevent uneven coating using some types of the treatment liquids. It is necessary to improve the treatment liquid. For example, by incorporating a fluorochemical surfactant and a cationic compound into the treatment liquid, a method of satisfying both improvement in image quality and improvement in fixability (PTL 4) has been proposed. The improvement in image quality and improvement in fixability are achieved, but the treatment liquid foams upon coating, causing uneven coating and failing to obtain image uniformity.

CITATION LIST

Patent Literature

PTL 1: Japanese Patent Application Laid-Open (JP-A) No. 2004-142291
PTL 2: JP-A No. 2004-330569
PTL 3: JP-A No. 2008-260307
PTL 4: JP-A No. 2009-166387

SUMMARY OF INVENTION

Technical Problem

The present invention aims to solve the above-mentioned problems, and achieves the following object.

An object of the present invention is to provide an inkjet treatment liquid having excellent effect on improvement in image quality, such as improvement in image density, image uniformity by decreasing color unevenness in an image, and to provide an inkjet recording apparatus.

Solution to Problem

Means for solving the above-mentioned problems are as follows:
<1> An inkjet treatment liquid containing: a water-soluble coagulating agent; a water-soluble organic solvent; a fluorochemical surfactant; a foam inhibitor; and water, wherein the foam inhibitor is a compound represented by General Formula (I), and the fluorochemical surfactant contains a compound represented by General Formula (II):

$$HOR_1R_3C-[CH_2]_n-CR_2R_4OH \qquad \text{General Formula (I)}$$

in General Formula (I), $R_1$ and $R_2$ each denote an alkyl group having 3 to 6 carbon atoms; $R_3$ and $R_4$ each denote an alkyl group having 1 or 2 carbon atoms; and n denotes an integer of 1 to 6; and

$$Rf-Q-Z \qquad \text{General Formula (II)}$$

in General Formula (II), Rf denotes a perfluoroalkyl group; Q denotes a bonding group; and Z denotes a hydrophilic group containing $-CH_2CH_2O)_n-$, $-COO^-$, $-SO_3^-$, $-SO_4^-$, or $-PO_4^-$; and n denotes an integer of 1 to 50.
<2> The inkjet treatment liquid according to <1>, wherein the compound represented by General Formula (I) is at least one of 2,4,7,9-tetramethyldecane-4,7-diol and 2,5,8,11-tetramethyldodecane-5,8-diol.
<3> The inkjet treatment liquid according to any of <1> and <2>, wherein the compound represented by General Formula (II) is at least one selected from compounds represented by General Formulas (III) to (VI):

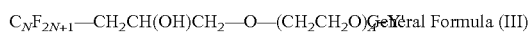
General Formula (III)

in General Formula (III), N denotes an integer of 2 to 6; A denotes an integer of 15 to 50; Y' denotes —$C_BH_{2B+1}$, where B denotes an integer of 11 to 19, or —$CH_2CH(OH)CH_2$—$C_DF_{2D+1}$, where D denotes an integer of 2 to 6,

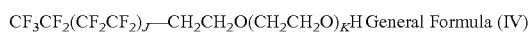
General Formula (IV)

in General Formula (IV), J denotes an integer of 0 to 10; and K denotes an integer of 0 to 40,

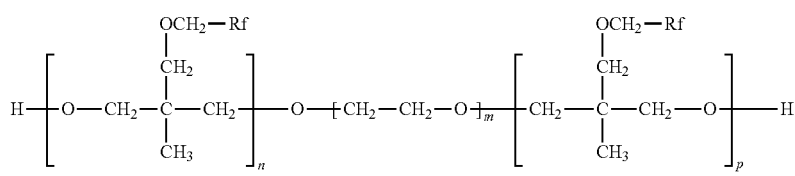

in General Formula (V), Rf denotes a perfluoroalkyl group; m denotes an integer of 6 to 25; and n and p each denote an integer of 1 to 6, and General Formula (VI)

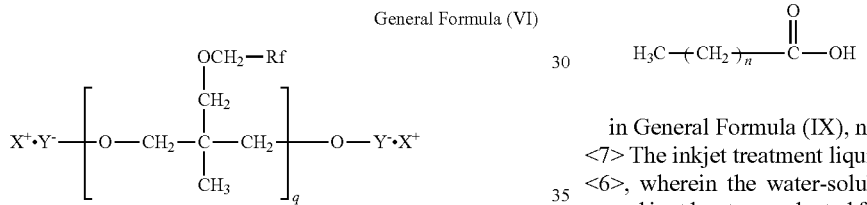

in General Formula (VI), Rf denotes a perfluoroalkyl group; $X^+$ denotes an ammonium group, a quaternary ammonium group or an alkali metal; $Y^-$ denotes —$COO^-$, —$SO_3^-$, —$SO_4^-$, or —$PO_4^-$; and q denotes an integer of 1 to 8.

<4> The inkjet treatment liquid according to any of <1> to <3>, wherein the water-soluble coagulating agent is at least one selected from a water-soluble aliphatic organic acid compound, an ammonium salt of a water-soluble aliphatic organic acid, a water-soluble metal salt compound, and a water-soluble cationic polymer.

<5> The inkjet treatment liquid according to any of <1> to <4>, wherein the water-soluble coagulating agent is the water-soluble aliphatic organic acid compound, and contains a molar equivalent amount or higher of a water-soluble organic monoamine compound relative to an acid group contained in the water-soluble aliphatic organic acid compound.

<6> The inkjet treatment liquid according to <5>, wherein the water-soluble aliphatic organic acid compound is at least one selected from compounds represented by General Formulas (VII) to (IX):

General Formula (VII)

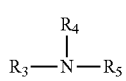

in General Formula (VII), $R_1$ denotes a hydrogen atom or a methyl group substituted by a carboxyl group; $R_2$ denotes a methyl group, a methyl group substituted by a carboxyl group, or a methyl group substituted by both a hydroxyl group and a carboxyl group, General Formula (VIII)

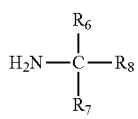

in General Formula (VIII), n denotes an integer of 0 to 4, and

General Formula (IX)

in General Formula (IX), n denotes an integer of 0 to 4.

<7> The inkjet treatment liquid according to any of <5> and <6>, wherein the water-soluble organic monoamine compound is at least one selected from compounds represented by General Formulas (X) and (XI):

General Formula (X)

$$R_3—\underset{\underset{R_5}{|}}{\overset{\overset{R_4}{|}}{N}}$$

in General Formula 00, $R_3$, $R_4$, and $R_5$ each denote a hydrogen atom, an alkoxy group having 1 to 4 carbon atoms, an alkyl group having 1 to 8 carbon atoms, a hydroxyethyl group or a hydroxypropyl group, with the proviso that a compound where all of $R_3$, $R_4$, and $R_5$ are hydrogen atoms is excluded, and General Formula (XI)

$$H_2N—\underset{\underset{R_7}{|}}{\overset{\overset{R_6}{|}}{C}}—R_8$$

in General Formula (XI), $R_6$ denotes a hydroxymethyl group, $R_7$ denotes a methyl group, an ethyl group, or a hydroxymethyl group; and $R_8$ denotes a hydrogen atom, an alkyl group having 1 to 4 carbon atoms, or a hydroxymethyl group.

<8> An inkjet recording apparatus including: a treatment liquid application unit configured to apply an inkjet treatment liquid to a recording medium; and an image forming unit configured to eject an inkjet ink to the recording medium coated with the inkjet treatment liquid, so as to form an image, wherein the inkjet treatment liquid is the inkjet treatment liquid according to any of <1> to <7>.

<9> An inkjet recording method including: applying an inkjet treatment liquid to a recording medium; and ejecting an inkjet ink to the recording medium coated with the inkjet treatment liquid, so as to form an image, wherein the inkjet treatment liquid is the inkjet treatment liquid according to any of <1> to <7>.

<10> An image formed matter obtained by the inkjet recording method according to <9>.

Advantageous Effects of Invention

As is apparent from the specific detailed description below, according to the present invention, conventional problems can be solved, and it is possible to provide a treatment liquid having excellent effect on improvement in image quality, such as improvement in image density, image uniformity by decreasing color unevenness in an image.

The inkjet treatment liquid of the present invention uses a specific foam inhibitor and a specific fluorochemical surfactant, so that the inkjet treatment liquid does not foam, and is excellent in uniform coatability, drying properties, and less causes color unevenness.

Moreover, by using a specific coagulating agent, the inkjet treatment liquid having excellent effect on improvement in image quality, such as image uniformity, improvement on image density, and drying properties, etc.

DESCRIPTION OF EMBODIMENTS

Figure 1:
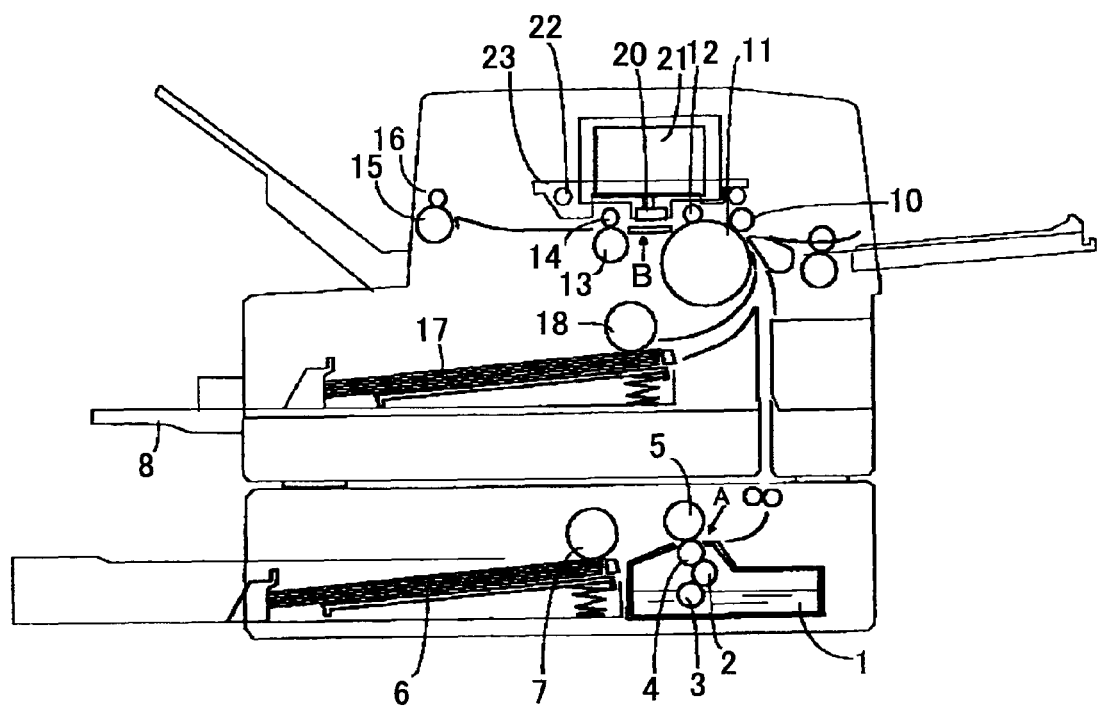
FIG. 1 is a schematic view showing an example of a recording apparatus using an inkjet treatment liquid of the present invention.

Hereinafter, the present invention will be specifically described by exemplifying the preferred embodiment.
(Inkjet Treatment Liquid)

The inkjet treatment liquid of the present invention contains at least a water-soluble coagulating agent, a water-soluble organic solvent, a fluorochemical surfactant, a foam inhibitor, and water, and if necessary, further contains other components.
<Foam Inhibitor>

In the present invention, the foam inhibitor is used to suppress foaming by being added to the inkjet treatment liquid in a small amount. Here, the foaming means that a liquid is formed into a thin film and wraps air. The properties such as surface tension and viscosity of the liquid relates to the foaming. Namely, the liquid having high surface tension such as water does not easily foam, since a force of decreasing surface area as small as possible effects on the liquid. By contrast, since the treatment liquid having high viscosity and high permeability has a low surface tension, it easily foams, and foam formed by the viscosity of the solution is likely to be maintained and does not easily disappear.

Generally, a foam inhibitor breaks foam by locally decreasing a surface tension of a foam film, or by scattering the foam inhibitor insoluble to a foam solution on the surface of the foam solution. When a fluorochemical surfactant having an outstandingly strong function of decreasing surface tension is used as a surfactant in the inkjet treatment liquid, the foam inhibitor having the former mechanism as described above cannot locally decrease the surface tension of the foam film. Thus, the fluorochemical surfactant is not normally used. Therefore, the foam inhibitor insoluble to a foam solution, namely the foam inhibitor having the latter mechanism as described above, is used. However, in this case, by using the foam inhibitor insoluble to a solution, the foam inhibitor is deposited when the inkjet treatment liquid is dried, causing decrease in stability.

By contrast, the inkjet treatment liquid of the present invention contains a compound represented by General Formula (I) as the foam inhibitor and a compound represented by General Formula (II) as the fluorochemical surfactant. The compound represented by General Formula (I) has a function of decreasing the surface tension, which is not stronger than that of the fluorochemical surfactant, but has a high compatibility to the fluorochemical surfactant. Thus, it is considered that the foam inhibitor is efficiently taken into a foam film, and that the surface of the foam film becomes a locally imbalance state because of the difference in surface tension between the fluorochemical surfactant and the foam inhibitor, followed by breaking foam.

As the foam inhibitor of the present invention, a compound represented by General Formula (I) is used.

$$HOR_1R_3C-[CH_2]_n-CR_2R_4OH \quad \text{General Formula (I)}$$

in General Formula (I), $R_1$ and $R_2$ each denote an alkyl group having 3 to 6 carbon atoms; $R_3$ and $R_4$ each denote an alkyl group having 1 to 2 carbon atoms; and n denotes an integer of 1 to 6.

Examples of the compounds represented by General Formula (I) include 2,4,7,9-tetramethyldecane-4,7-diol, and 2,5,8,11-tetramethyldodecane-5,8-diol. Because of foam inhibiting effect and high compatibility to an ink, 2,5,8,11-tetramethyldodecane-5,8-diol is particularly preferable.

The amount of the foam inhibitor in the treatment liquid is not particularly limited and may be suitably adjusted in accordance with the intended use. It is preferably 0.01% by mass to 10% by mass, and more preferably 0.1% by mass to 5% by mass. When the amount of the foam inhibitor is less than 0.01% by mass, the effect of suppressing foam may not be obtained. When the amount of the foam inhibitor is more than 10% by mass, the foam suppression effect is not improved, and adverse affects occur, for example, the viscosity increases, and the solubility of the water-soluble coagulating agent decreases.
<Fluorochemical Surfactant>

As the fluorochemical surfactant, a compound represented by the following General Formula (II) is used.

$$Rf-Q-Z \quad \text{General Formula (II)}$$

in General Formula (II), Rf denotes a perfluoroalkyl group; Q denotes a bonding group; Z denotes a hydrophilic group containing $-(CH_2CH_2O)_n-$, $-COO-$, $-SO_3^-$, $-SO_4^-$, or $-PO_4^-$; and n denotes an integer of 1 to 50.

Examples of the bonding group Q of General Formula (II) include a single bond, a linear alkylene group, a branched alkylene group, alkyl ether, arylene, sulfonyl, sulfonamide, carbonamide, $-CH_2CH(OH)CH_2O-$, and a bonding group having an urethane structure.

Among the compounds represented by General Formula (II), at least one selected from compounds represented by General Formulas (III) to (VI) is particularly preferable.

$$C_NF_{2N+1}-CH_2CH(OH)CH_2-(CH_2CH_2O)_A-Y' \quad \text{General Formula (III)}$$

In General Formula (III), N denotes an integer of 2 to 6; A denotes an integer of 15 to 50; and Y' denotes $-C_BH_{2B+1}$ (B denotes an integer of 11 to 19) or —CH$_2$CH(OH)CH$_2$—C$_D$F$_{2D+1}$ (D denotes an integer of 2 to 6).

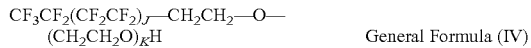

General Formula (IV)

in General Formula (IV), J denotes an integer of 0 to 10; and K denotes an integer of 0 to 40.

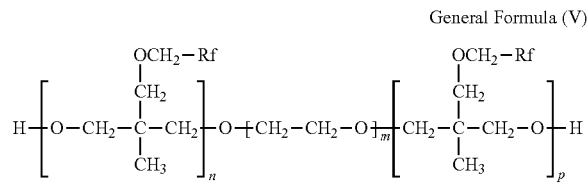

General Formula (V)

in General Formula (V), Rf denotes a perfluoroalkyl group; m denotes an integer of 6 to 25; and n and p each denote an integer of 1 to 6.

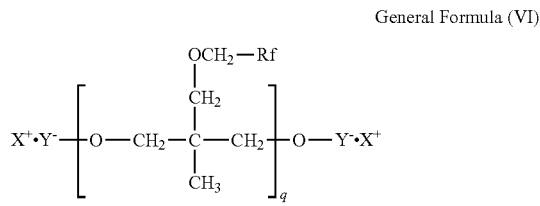

General Formula (VI)

in General Formula (VI), Rf denotes a perfluoroalkyl group; X$^+$ denotes an ammonium group, quaternary ammonium group, or alkali metal; Y$^-$ denotes —COO$^-$, —SO$_3^-$, —SO$_4^-$, or —PO$_4^-$; and q denotes an integer of 1 to 8.

Examples of the compounds represented by General Formula (II) and the compounds represented by General Formula (III) include compounds represented by Formulas a) to u), because of high ability of decreasing the surface tension, and high permeability, etc.

a) C$_4$F$_9$—COO—(CH$_2$CH$_2$O)$_{23}$—C$_{12}$H$_{25}$
b) C$_4$F$_9$—SO$_2$N(CH$_3$)—(CH$_2$CH$_2$O)$_{21}$—C$_{12}$H$_{25}$
c) C$_4$F$_9$—CH$_2$CH$_2$O—(CH$_2$CH$_2$O)$_{25}$—C$_{12}$H$_{25}$
d) C$_4$F$_9$—CH$_2$CH(OH)CH$_2$O—(CH$_2$CH$_2$O)$_{21}$—C$_{14}$H$_{29}$
e) C$_4$F$_9$—CH$_2$CH(OH)CH$_2$O—(CH$_2$CH$_2$O)$_{21}$—C$_{12}$H$_{25}$
f) C$_4$F$_9$—CH$_2$CH(OH)CH$_2$O—(CH$_2$CH$_2$O)$_{25}$—C$_{12}$H$_{25}$
g) C$_4$F$_9$—CH$_2$CH(OH)CH$_2$O—(CH$_2$CH$_2$O)$_{30}$—C$_{12}$H$_{25}$
h) C$_4$F$_9$—CH$_2$CH(OH)CH$_2$O—(CH$_2$CH$_2$O)$_{20}$—C$_{14}$H$_{29}$
i) C$_4$F$_9$—CH$_2$CH(OH)CH$_2$O—(CH$_2$CH$_2$O)$_{30}$—C$_{14}$H$_{29}$
j) C$_4$F$_9$—CH$_2$CH(OH)CH$_2$O—(CH$_2$CH$_2$O)$_{23}$—C$_{16}$H$_{33}$
k) C$_4$F$_9$—CH$_2$CH(OH)CH$_2$O—(CH$_2$CH$_2$O)$_{20}$—C$_{16}$H$_{33}$
l) C$_4$F$_9$—CH$_2$CH(OH)CH$_2$O—(CH$_2$CH$_2$O)$_{25}$—C$_{16}$H$_{33}$
m) C$_4$F$_9$—CH$_2$CH(OH)CH$_2$O—(CH$_2$CH$_2$O)$_{30}$—C$_{16}$H$_{33}$
n) C$_4$F$_9$—CH$_2$CH(OH)CH$_2$O—(CH$_2$CH$_2$O)$_{40}$—C$_{16}$H$_{33}$
o) C$_4$F$_9$—CH$_2$CH(OH)CH$_2$O—(CH$_2$CH$_2$O)$_{20}$—C$_{18}$H$_{37}$
q) C$_4$F$_9$—CH$_2$CH(OH)CH$_2$O—(CH$_2$CH$_2$O)$_{30}$—C$_{18}$H$_{37}$
r) C$_4$F$_9$—CH$_2$CH(OH)CH$_2$O—(CH$_2$CH$_2$O)$_{40}$—C$_{18}$H$_{37}$
s) C$_4$F$_9$—CH$_2$CH(OH)CH$_2$O—(CH$_2$CH$_2$O)$_{23}$—CH$_2$CH(OH)CH$_2$—C$_4$F$_9$
t) C$_4$F$_9$—CH$_2$CH(OH)CH$_2$O—(CH$_2$CH$_2$O)$_{35}$—CH$_2$CH(OH)CH$_2$—C$_4$F$_9$
u) C$_4$F$_9$—CH$_2$CH(OH)CH$_2$O—(CH$_2$CH$_2$O)$_{45}$—CH$_2$CH(OH)CH$_2$—C$_4$F$_9$

Among these, the compounds represented by Formulas e), f), t), and u) are particularly preferable because they have excellent compatibility with the compound represented by General Formula (I).

In the compound represented by General Formula (III), a Griffin's HLB value is preferably 10 to 16, because of the solubility to the inkjet treatment liquid. In the compound represented by General Formula (III), the molecular weight of a polyoxyethylene group [(CH$_2$CH$_2$O)$_A$ part] (MWEO) and the molecular weight of a fluoroalkyl group (C$_N$F$_{2N+1}$ part and C$_D$F$_{2D+1}$ part) (MWF) preferably satisfy the following relation: MWEO/MWF=2.2 to 10, because of the function as a surfactant and a balance of solubility to water, etc.

In the compound represented by General Formula (IV), J is preferably 0 to 10, and K is preferably 0 to 40, because of the function of a water-soluble surfactant. As the compound represented by General Formula (IV), commercially available fluorochemical surfactants can be used. Examples thereof include SURFLON S-111, S-112, S-113, S-121, S-131, S-132, S-141 and S-145 (all of which are manufactured by Asahi Glass Co., Ltd.), FLUORAD FC-93, FC-95, FC-98, FC-129, FC-135, FC-170C, FC-430, FC-431 and FC-4430 (all of which are manufactured by Sumitomo 3M Limited), MEGAFACE F-470, F-1405 and F-474 (all of which are manufactured by DIC Corporation), ZONYL FS-300, FSN, FSN-100 and FSO (all of which are manufactured by E.I. du Pont de Nemours & Company), EFTOP EF-351, EF-352, EF-801, EF-802 (all of which are manufactured by Mitsubishi Materials Electronic Chemicals Co., Ltd.). Among these, ZONYL FS-300, FSN, FSN-100 and FSO manufactured by E.I. du Pont de Nemours & Company are particularly preferable in reliability and color-developing. These commercially available products are mixtures of compounds having several molecular weights, wherein Js and Ks in the compounds represented by General Formula (IV) largely vary, but no problem occurs in the effect of the present invention.

In the compound represented by General Formula (V), a perfluoroalkyl group is particularly preferable as Rf because of the function of the surfactant. As the perfluoroalkyl group, the perfluoroalkyl group having 1 to 10 carbon atoms is preferable, and the perfluoroalkyl group having 1 to 3 carbon atoms is more preferable. As such perfluoroalkyl group, those represented by —C$_n$F$_{2n+1}$, where n denotes an integer of 1 to 10, are exemplified. Examples thereof include —CF$_3$, —CF$_2$CF$_3$, —C$_3$F$_7$, and —C$_4$F$_9$. Among these, —CF$_3$, and —CF$_2$CF$_3$ are particularly preferable. In the compound represented by General Formula (V), m, n, and p each denote an integer, and n is preferably 1 to 6, m is preferably 6 to 25, and p is preferably 1 to 6.

In the compound represented by General Formula (VI), as Rf, a perfluoroalkyl group similar to the compound represented by General Formula (V) is preferable. For example, —CF$_3$, —CF$_2$CF$_3$, —C$_3$F$_7$, and —C$_4$F$_9$ are preferable. In the compound represented by General Formula (VI), X$^+$ denotes a cation group. Examples of the cation group include an ammonium group, a quaternary ammonium group, and alkali metal ion. Among these, a quaternary ammonium group is particularly preferable.

The quaternary ammonium group is a derivative of an ammonium group, in which all four hydrogen atoms are replaced with a (optionally substituted) hydrocarbon group via N—C bonds.

Examples of the hydrocarbon group include an alkyl group, cycloalkyl group, aryl group, alkaryl group and aralkyl group.

Examples of the alkyl group include a methyl group, ethyl group, n-propyl group, isopropyl group, 1-n-butyl group, 2-n-butyl group, isobutyl group, t-butyl group, n-pentyl group, isopentyl group, neopentyl group, tert-pentyl group, hexyl group, heptyl group, octyl group, nonyl group, decyl group, dodecyl group, and octadecyl group.

Examples of the cycloalkyl group include a cyclopentyl group, cyclohexyl group, cycloheptyl group, and methylcyclohexyl group.

Examples of the aryl group include a phenyl group, naphthyl group, anthryl group, and phenanthryl group.

Examples of the alkaryl group include an o-tolyl group, m-tolyl group, p-tolyl group, xylyl group, and ethyl phenyl group.

Examples of the aralkyl group include a benzyl group, α-phenylethyl group, and β-phenylethyl group.

Examples of the hexyl group include an n-hexyl group.

Examples of the heptyl group include an n-heptyl group.

Examples of the octyl group include an n-octyl group, isooctyl group, and 4-trimethylpentyl group.

Examples of the nonyl group include an n-nonyl group.

Examples of the decyl group include an n-decyl group.

Examples of the dodecyl group include an n-dodecyl group.

Examples of the octadecyl group include an n-octadecyl group.

Examples of the alkali metal include lithium, sodium and potassium, rubidium and cesium.

In the compound represented by General Formula (VI), $Y^-$ denotes an anion group; and q denotes an integer and is preferably 1 to 8. Examples of the anion group include $-COO^-$, $-SO_3^-$, $-SO_4^-$, and $-PO_4^-$.

As at least one fluorochemical surfactant selected from the compounds represented by General Formula (V) and the compounds represented by General Formula (VI), at least one selected from the compounds represented by General Formula (V-I) and the compounds represented by General Formula (VI-I) is preferable in terms of safety.

General Formula (V-I)

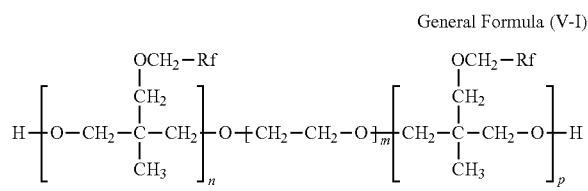

in General Formula (V-I), Rf denotes $-CF_3$ or $-CF_2CF_3$; n denotes an integer of 1 to 6; m denotes an integer of 6 to 25; and p denotes an integer of 1 to 6.

General Formula (VI-I)

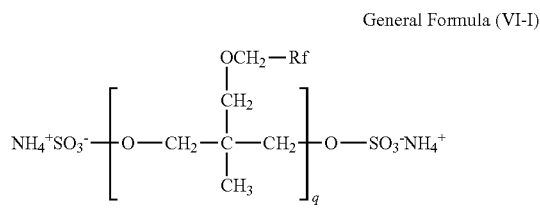

in General Formula (VI-I), Rf denotes $-CF_3$ or $-CF_2CF_3$; and q denotes an integer of 1 to 8.

The amount of the fluorochemical surfactant in the inkjet treatment liquid is not particularly limited, and may be suitably selected in accordance with the intended use. It is preferably 0.01% by mass to 10% by mass, and more preferably 0.03% by mass to 5% by mass. When the amount of the fluorochemical surfactant is less than 0.01% by mass, the effect of improving color developing ability may not be obtained in such a degree that is capable of being realized by visual observation. When it is more than 10% by mass, the effect of color developing ability is not improved, and the physical properties of the treatment liquid, such as a viscosity, particle diameter, etc. may be adversely affected.

In the inkjet treatment liquid of the present invention, at least one fluorochemical surfactant selected from the compounds represented by General Formula (II) may be used alone, or two or more of the selected fluorochemical surfactants may be used in combination. Moreover, other fluorochemical surfactants, nonionic surfactants, anionic surfactants, ampholytic surfactants or acetylene glycol surfactants may be used in combination with the fluorochemical surfactant represented by General Formula (II). The fluorochemical surfactant selected from the compounds represented by General Formulas (III) to (VI) is particularly preferably used.

<Water-Soluble Organic Solvent>

The water-soluble organic solvent used in the present invention is not particularly limited and may be suitably selected in accordance with the intended use. Examples of the water-soluble organic solvent include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate. The water-soluble organic solvents retain a large amount of water therein even when the water in the inkjet treatment liquid evaporates and reaches an equilibrium state, thereby imparting flowability to the inkjet treatment liquid.

In this case, by using a water-soluble organic solvent having a high equilibrium water content as the water-soluble organic solvent, it is possible to prevent an excessive increase in viscosity of the ink even when the water in the inkjet treatment liquid evaporates and reaches an equilibrium state.

As the water-soluble organic solvent having a high-equilibrium water content, water-soluble organic solvent having an equilibrium water content of 30% by mass or more is preferable, 40% by mass or more is more preferable, under the environment of 23° C. and 80% RH (hereinafter, referred to as "water-soluble organic solvent A"). Note that the term "equilibrium water content" means a water content when a mixture of a water-soluble organic solvent and water is released into the air at a certain temperature and a certain humidity, and the evaporation of water in the solution and absorption of water in the air into the organic solvent is in an equilibrium state. More specifically, an equilibrium water content can be measured using a potassium chloride-saturated aqueous solution and a desiccator. The internal temperature of the desiccator is maintained at 23° C.±1° C. and the internal humidity thereof is maintained at 80%±3%. Then, each sample of aqueous organic solvents is weighed 1 g and poured in a petri dish, and the petri dish is placed in the desiccator and stored until there is no more change in mass of the sample, and an equilibrium water content of the sample can be determined by the following equation.

Equilibrium Water Content (%)=Amount of water absorbed into organic solvent/(Amount of organic solvent+Amount of water absorbed into organic solvent)×100

As the water-soluble organic solvent A preferably used in the present invention, polyhydric alcohols having an equilibrium water content of 30% by mass or more under the environment of 23° C. and 80% RH are exemplified. Specific examples of such water-soluble organic solvent A include 1,2,3-butanetriol (bp175° C./33 hPa, 38% by mass), 1,2,4-butanetriol (bp190° C.-191° C./24 hPa, 41% by mass), glycerin (bp290° C., 49% by mass), diglycerin (bp270° C./20 hPa, 38% by mass), triethylene glycol (bp285° C., 39% by mass), tetraethylene glycol (bp324° C.-330° C., 37% by mass), diethylene glycol (bp245° C., 43% by mass), and 1,3-butanediol (bp203° C.-204° C., 35% by mass). Among these, glycerin and 1,3-butanediol are particularly preferably used because when these materials contain water, the viscosity of these compounds decreases, and the pigment dispersion can be stably maintained without aggregation. It is desirable to use the water-soluble organic solvent A in an amount of 50% by mass or more relative to the total amount of the water-soluble organic solvents used, because the ejection stability can be secured, and the resulting ink is excellent in preventing adhesion of waste ink to instruments used to maintain the ink ejection apparatus.

The inkjet treatment liquid of the present invention may be used in combination with a water-soluble organic solvent having an equilibrium water content less than 30% by mass under the environment of 23° C. and 80% RH (hereinafter, called "water-soluble organic solvent B"), instead of a part of or in addition to the water-soluble organic solvent A as necessary. Examples of the water-soluble organic solvent B include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, and other water-soluble organic solvents.

Specific examples of the polyhydric alcohols of the water-soluble organic solvent B include dipropylene glycol (bp232° C.), 1,5-pentanediol (bp242° C.), 3-methyl-1,3-butanediol (bp203° C.), propylene glycol (bp187° C.), 2-methyl-2,4-pentanediol (bp197° C.), ethylene glycol (bp196° C. -198° C.), tripropylene glycol (bp267° C.), hexylene glycol (bp197° C.), polyethylene glycol (viscosity-controlled liquid to solid), polypropylene glycol (bp187° C.), 1,6-hexanediol (bp253° C.-260° C.), 3-methyl-1,3-hexanediol, 1,2,6-hexanetriol (bp178° C.), trimethylolethane (solid, mp 199° C.-201° C.), and trimethylolpropane (solid, mp 61° C.).

Examples of the polyhydric alcohol alkyl ethers include ethylene glycol monoethylether (bp135° C.), ethylene glycol monobutylether (bp171° C.), diethylene glycol monomethylether (bp194° C.), diethylene glycol monoethylether (bp197° C.), diethylene glycol monobutylether (bp231° C.), ethylene glycol mono-2-ethylhexylether (bp229° C.), and propylene glycol monoethylether (bp132° C.). Examples of the polyhydric alcohol aryl ethers include ethylene glycol monophenyl ether (bp237° C.), and ethylene glycol monobenzyl ether.

Examples of the nitrogen-containing heterocyclic compounds include 2-pyrrolidone (bp250° C., mp 25.5° C., 47% by mass −48% by mass), N-methyl-2-pyrrolidone (bp202° C.), 1,3-dimethyl-2-imidazolidionone (bp226° C.), ε-caprolactam (bp270° C.), and γ-butyrolactone (bp204° C.-205° C.). Examples of the amides include formamide (bp210° C. N-methylformamide (bp199° C.-201° C.), N,N-dimethylformamide (bp153° C.), and N,N-diethylformamide (bp176° C.-177° C.). Examples of the amines include monoethanolamine (bp170° C.), dimethanolamine (bp268° C.), triethanolamine (bp360° C.), N,N-dimethylmonoethanolamine (bp139° C.), N-methyldiethanolamine (bp243° C.), N-methylethanolamine (bp159° C.), N-phenylethanolamine (bp282° C.-287° C.), and 3-aminopropyl diethylamine (bp169° C.). Examples of the sulfur-containing compounds include dimethylsulfoxide (bp139° C.), sulfolane (bp285° C.), and thiodiglycol (bp282° C.).

As other solid water-soluble organic solvents, saccharides are preferable.

Examples of the saccharides include monosaccharides, disaccharides, oligosaccharides (including trisaccharides and tetrasaccharides), and polysaccharides. Specific examples thereof include glucose, mannose, fructose, ribose, xylose, arabinose, galactose, maltose, cellobiose, lactose, sucrose, trehalose, and maltotriose. Here, the above-mentioned polysaccharides mean broad sense-saccharides, which may include materials existing widely in nature, such as α-cyclodextrin and cellulose. Derivatives of these saccharides include reducing sugars of saccharides (for example, sugar alcohol, which is represented by the general formula: $HOCH_2(CHOH)_nCH_2OH$, where n is an integer of 2 to 5), oxidized sugars (for example, aldonic acids and uronic acids), amino acids, and thio acids. Among these, sugar alcohol is preferable. Specific examples of sugar alcohol include maltitol and sorbitol.

The amount of the water-soluble organic solvent contained in the inkjet treatment liquid is not particularly limited, and may be suitably selected in accordance with the intended use. It is preferably 10% by mass to 80% by mass, and more preferably 15% by mass to 60% by mass. When the amount of the water-soluble organic solvent is more than 80% by mass, the recording medium after treatment may be hardly dried depending on the type of the water-soluble organic solvent used. When the amount is less than 10% by mass, water in the treatment liquid evaporates in the treatment liquid application step, etc., possibly causing significant change in the composition of the treatment liquid.

<Water-Soluble Coagulating Agent>

The water-soluble coagulating agent used in the present invention is not particularly limited and may be suitably selected in accordance with the intended use. Examples thereof include water-soluble aliphatic organic acid compounds, ammonium salts of water-soluble aliphatic organic acids, water-soluble metal salt compounds, and water-soluble cationic polymers.

By adding the water-soluble coagulating agent to the inkjet treatment liquid, the pigment contained therein easily accumulates on the surfaces of recording media, and salting-out effect is improved, thereby increasing image density. In the case where the water-soluble aliphatic organic acid compound is used, it is preferred that a water-soluble organic monoamine compound be contained in an amount of a molar equivalent amount or higher relative to an acid group contained in the water-soluble aliphatic organic acid compound. Generally, an inkjet treatment liquid is set to have a low pH, and when the inkjet treatment liquid comes into contact with an inkjet ink, an anionic pigment is coagulated (acid deposition) to fix on a recording medium, thereby causing less feathering, and color bleeding. In the case where the water-soluble aliphatic organic acid compound is used in combination with the water-soluble organic monoamine compound, an anionic pigment is ion-exchanged with a neutralized material of the water-soluble aliphatic organic acid compound and the water-soluble organic monoamine compound, so as to coagulate (salting out), thereby suppressing dot shrinkage and improving image density, and at the same time, allowing a vehicle contained in the inkjet ink to quickly penetrate into a recording medium. Consequently, image density, fixability and drying properties can be improved at the same time.

—Water-Soluble Aliphatic Organic Acid Compound—

As the water-soluble aliphatic organic acid compounds, compounds represented by General Formulas (VII) to (IX) are preferable.

General Formula (VII)

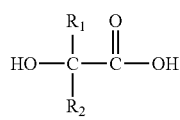

in General Formula (VII), $R_1$ denotes a hydrogen atom or a methyl group substituted by a carboxyl group; and $R_2$ denotes a methyl group, a methyl group substituted by a carboxyl group, or a methyl group substituted by a hydroxyl group and a carboxyl group.

General Formula (VIII)

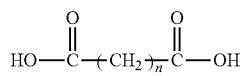

in General Formula (VIII), n is an integer of 0 to 4.

General Formula (IX)

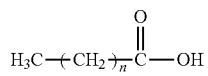

in General Formula (IX), n is an integer of 0 to 4.

Examples of the compounds represented by General Formula (VII) include lactic acid (pKa: 3.83), malic acid (pKa: 3.4), citric acid (pKa: 3.13), and tartaric acid (pKa: 2.93).

Examples of the compounds represented by General Formula (VIII) include oxalic acid (pKa: 1.04), malonic acid (pKa: 2.05), succinic acid (pKa: 4.21), and adipic acid (pKa: 4.42).

Examples of the compounds represented by General Formula (IX) include acetic acid (pKa: 4.76), propionic acid (pKa: 4.87), butyric acid (pKa: 4.82), and valeric acid (pKa: 4.82).

Examples of the carboxyl group-containing water-soluble aliphatic organic acids other than the compounds represented by any one of General Formulas (VII) to (IX) include gluconic acid (pKa: 2.2), pyruvic acid (pKa: 2.49), and fumaric acid (pKa: 3.02).

Examples of the water-soluble aliphatic organic acid compounds include sulfo group-containing water-soluble aliphatic organic acids. As the sulfo group-containing water-soluble aliphatic organic acid, taurine is preferably used.

—Ammonium Salt of Water-soluble Aliphatic Organic Acid—

Examples of the ammonium salts of water-soluble aliphatic organic acids include ammonium acetate, ammonium lactate, ammonium propionate, and ammonium succinate.

—Water-Soluble Metal Salt Compound—

Examples of the water-soluble metal salt compounds include water-soluble divalent metal salt compounds and water-soluble monovalent alkali metal salt compounds.

Examples of the water-soluble divalent metal salt compounds include magnesium sulfate, aluminum sulfate, manganese sulfate, nickel sulfate, iron(II) sulfate, copper(II) sulfate, zinc sulfate, iron(II) nitrate, iron(III) nitrate, cobalt nitrate, strontium nitrate, copper(II) nitrate, nickel(II) nitrate, lead(II) nitrate, manganese(II) nitrate, nickel(II) chloride, calcium chloride, tin(II) chloride, strontium chloride, barium chloride, and magnesium chloride.

Examples of the water-soluble monovalent alkali metal salt compounds include sodium sulfate, potassium sulfate, lithium sulfate, sodium hydrogen sulfate, potassium hydrogen sulfate, sodium nitrate, potassium nitrate, sodium carbonate, potassium carbonate, sodium carbonate, potassium hydrogen carbonate, sodium chloride, and potassium chloride.

—Water-Soluble Cationic Polymer—

The water-soluble cationic polymers are not particularly limited and may be suitably selected in accordance with the intended use. As the water-soluble cationic polymers, cationic polymer compounds of quaternary ammonium salts are preferably used. Examples thereof include dialkyl allyl ammonium chloride polymers, dialkyl aminoethyl (meth) acrylate quaternary ammonium salt polymers, modified polyvinyl alcohol dialkyl ammonium salt polymers and dialkyl diallyl ammonium salt polymers. Examples of the water-soluble cationic polymers other than the cationic polymer compounds of quaternary ammonium salts include cationic epichlorohydrin condensates, cationic specially-modified polyamine compounds, cationic polyamide polyamine compounds, cationic urea-formalin resin compounds, cationic polyacrylamide compounds, cationic alkyl ketene dimmers, cationic dicyandiamide compounds, cationic dicyandiamide-formalin condensation compounds, cationic dicyandiamide-polyamine condensation compounds, cationic polyvinyl formamide compounds, cationic polyvinyl pyridine compounds, cationic polyalkylene polyamine compounds and cationic epoxy polyamide compounds. Particularly preferable compounds are the compounds represented by following General Formulas (1) to (3).

General Formula (1)

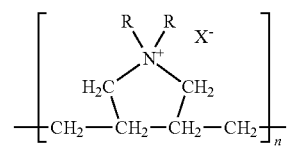

in General Formula (I), R denotes a methyl group or ethyl group; $X^-$ denotes a halogen ion; and n denotes an integer of 1 or more.

General Formula (2)

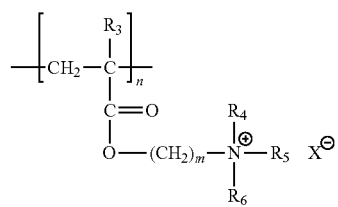

in General Formula (2), $X^-$ denotes an anion selected from a halogen ion, nitric acid ion, nitrous acid ion and acetic acid ion; $R_3$ denotes a hydrogen atom or a methyl group; $R_4$, $R_5$ and $R_6$ each denotes a hydrogen atom or an alkyl group; and n denotes an integer of 1 or more; and m denotes an integer of 1 to 3.

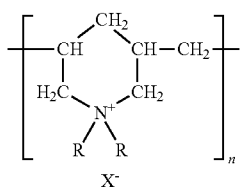

General Formula (3)

in General Formula (3), R denotes a methyl group or ethyl group; X⁻ denotes an anion selected from a halogen ion, nitric acid ion, nitrous acid ion and acetic acid ion; and n denotes an integer of 1 or more.

The water-soluble cationic polymer allows a colorant and a water dispersible resin to aggregate so as to remain the colorant on a surface of plain paper, thereby improving image quality, such as image density and causing less feathering.

The amount added of the water-soluble coagulating agent is preferably 0.1% by mass to 30% by mass, more preferably 1% by mass to 20% by mass relative to the inkjet treatment liquid. When the added amount is more than 30% by mass, the water-soluble aliphatic organic acid compound may not be sufficiently dissolved and may be deposited. When the added amount is less than 0.1% by mass, the effect of improving image density may decrease.

—Water-Soluble Organic Monoamine Compound—

The water-soluble organic monoamine compounds may be any of primary, secondary, tertiary, quaternary amines and salts thereof. Note that in the present invention, the term "quaternary amine" means a compound in which a nitrogen atom is substituted with four alkyl groups.

As the water-soluble organic monoamine compounds, compounds represented by one of the following General Formulas (X) and (XI) are preferably used.

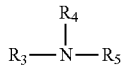

General Formula (X)

in General Formula (X), $R_3$, $R_4$, and $R_5$ each denote a hydrogen atom, an alkoxy group having 1 to 4 carbon atoms, an alkyl group having 1 to 8 carbon atoms, a hydroxyethyl group or a hydroxypropyl group, with the proviso that the compound where all of $R_3$, $R_4$, and $R_5$ are hydrogen atoms is excluded.

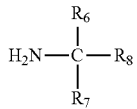

General Formula (XI)

In General Formula (XI), $R_6$ denotes a hydroxymethyl group; $R_7$ denotes a methyl group, an ethyl group or a hydroxymethyl group; $R_8$ denotes a hydrogen atom, an alkyl group having 1 to 4 carbon atoms or a hydroxymethyl group.

Examples of the compounds represented by General Formula (X) include dimethylamine, ethylamine, diethylamine, triethylamine, propylamine, dipropylamine, isopropylamine, diisopropylamine, n-butylamine, t-butylamine, sec-butylamine, di-n-butylamine, tributylamine, pentylamine, dipentylamine, tripentylamine, 2-ethylhexylamine, di-2-ethyl-hexylamine, di-n-octylamine, tri-n-octylamine, 1-amino-2-propanol, 3-amino-1-propanol, N-methylethanolamine, N,N-diethylethanolamine, N,N-dimethylethanolamine, N-methyldiethanoamine, diethanoamine, triethanolamine, triisopropanolamine, N-butyldiethanolamine, and N,N-dibutylethanolamine.

Examples of the compounds represented by General Formula (XI) include 2-amino-2-ethyl-1,3-propanediol, 2-amino-2-(hydroxymethyl)-1,3-propanediol, 2-amino-2-methyl-1,3-propanediol, 2-amino-2-methyl-1-propanol and tris(hydroxymethyl)aminomethane.

Examples of the water-soluble organic monoamine compounds other than the compounds represented by one of General Formulas (X) and (XI) include allylamine, diallylamine, 3-ethoxypropylamine, 2-(2-aminoethoxy)ethanol, 3-methoxypropylamine, and choline.

The addition amount of the water-soluble organic monoamine compound is preferably approximately 1.0 mol to approximately 1.5 mol, and more preferably approximately 1.0 mol to approximately L2 mol relative to 1 mol of the acid group contained in the water-soluble aliphatic organic acid compound. Since the water-soluble organic monoamine compound is necessary for producing a salt neutralized together with the organic acid and it is important for the inkjet treatment liquid to have a pH of 5 or higher, it is necessary to suitably control the amount of the water-soluble organic monoamine compound according to the type of organic acid. When the addition amount of the water-soluble organic monoamine compound is less than 1.0 mol relative to 1 mol of the acid group contained in the water-soluble aliphatic organic acid compound, white streaks may occur due to narrowed dots of an image formed matter. When the addition amount of the water-soluble organic monoamine compound is more than 1.5 mol, the water-soluble organic monoamine compound released in the treatment liquid may accelerate permeation of the inkjet ink to cause a decrease in image density.

<Other Components>

The inkjet treatment liquid of the present invention preferably contains, as a penetrant, at least one of non-wettable polyol compounds having 8 to 11 carbon atoms or glycol ether compounds. Here, these compounds preferably each have a solubility in the range of 0.2% by mass to 5.0% by mass in water at 25° C. Among these penetrants, 2-ethyl-1,3-hexane diol (solubility: 4.2% by mass at 25° C.) is preferable, and 2,2,4-trimethyl-1,3-pentanediol (solubility: 2.0% by mass at 25° C.) is more preferable.

As the other non-wettable polyol compounds, aliphatic diols are used. Examples thereof include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexen-1,2-diol.

The other penetrants usable in the inkjet treatment liquid are not particularly limited, as long as they can be dissolved in the inkjet treatment liquid and adjusted to have desired physical properties, and may be suitably selected in accordance with the intended use. Examples thereof include alkyl and aryl ethers of polyhydric alcohols, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohols, such as ethanol.

The amount of the penetrant contained in the inkjet treatment liquid is not particularly limited, and may be suitably selected in accordance with the intended use. It is preferably 0.1% by mass to 5.0% by mass. When the amount of the penetrant is less than 0.1% by mass, the effect of penetrating the inkjet ink may disappear. When it is more than 5.0% by mass, the penetrant is separated from a solvent because of its low solubility thereto and the effect of improving permeability may be saturated.

As required, the antiseptics and anticorrosives, which are described below, may be used in the inkjet treatment liquid.

<Production Method of Inkjet Treatment Liquid>

The inkjet treatment liquid is produced according to the following procedure: the water-dispersible coagulating agent, the water-soluble organic solvent, the fluorochemical surfactant, the foam inhibitor and water, and if necessary, other components are dispersed or dissolved in an aqueous medium, and further if necessary, the mixed dispersion or solution is stirred and mixed. The stirring and mixing can be carried out by a sand mill, homogenizer, ball mill, paint shaker, ultrasonic wave dispersing machine, or the like. The stirring and mixing can also be carried out with a stirring device using an ordinary stirring blade, a magnetic stirrer, a high-speed dispersing device, or the like.

(Inkjet Recording Apparatus, Inkjet Recording Method and Image Formed Matter)

An inkjet recording apparatus of the present invention includes at least a treatment liquid application unit configured to apply an inkjet treatment liquid to a recording medium, and an image forming unit configured to eject an inkjet ink to the recording medium coated with the inkjet treatment liquid, so as to form an image, and further includes other units as necessary.

The inkjet treatment liquid used in the inkjet recording apparatus is the inkjet treatment liquid of the present invention.

An inkjet recording method includes at least applying an inkjet treatment liquid to a recording medium (treatment liquid application step); and ejecting an inkjet ink to the recording medium coated with the inkjet treatment liquid, so as to form an image (image forming step), and further includes other steps as necessary.

The inkjet treatment liquid used in the inkjet recording method is the inkjet treatment liquid of the present invention.

The inkjet recording method can be performed by the inkjet recording apparatus, and the treatment liquid application step can be suitably performed by the treatment liquid application unit, and the image forming step can be suitably performed by the image forming unit.

An image formed matter of the present invention can be obtained by the inkjet recording method.

<Treatment Liquid Application Unit and Treatment Liquid Application Step>

The treatment liquid application unit is not particularly limited as long as the unit is configured to apply the inkjet treatment liquid to a recording medium and may be suitably selected in accordance with the intended use.

The treatment liquid application step is not particularly limited as long as the inkjet treatment liquid is uniformly applied to a recording medium surface, and may be suitably selected in accordance with the intended use. Examples of such application method include a blade coating method, gravure coating method, gravure offset coating method, bar coating method, roll coating method, knife coating method, air-knife coating method, comma coating method, U-comma coating method, AKKU coating method, smooth coat method, micro-gravure coating method, reverse roll coating method, four-roll or five-roll coating method, dip coating method, curtain coating method, slide coating method, and dye coating method.

The treatment liquid application step may be carried out on a recording medium whose surface is sufficiently dry or on a recording medium whose surface is being dried, since the effect of the treatment can be exhibited. Note that the recording medium that has been subjected to the treatment may be dried if necessary. In this case, the recording medium may be dried by a roll heater, drum heater, hot air or the like.

The treatment liquid application step is preferably performed before the following image formation step, but it may be performed after the image forming step, or at the same time during the image forming step.

A coating amount of the inkjet treatment liquid to a recording medium, in the treatment step, is preferably 0.1 g/m$^2$ to 30.0 g/m$^2$, and more preferably 0.2 g/m$^2$ to 10.0 g/m$^2$. When the coating amount is less than 0.1 g/m$^2$, almost no improvement in image quality (image density, color saturation, color bleeding resistance, feathering resistance and resistance to causing white spot) may not be observed. When the coating amount is more than 30.0 g/m$^2$, the texture as plain paper may be impaired, and paper curling may occur.

—Recording Medium—

The recording medium is not particularly limited and may be suitably selected in accordance with the intended use. Plain paper having no coat layer is preferably used. Plain paper having a sizing degree of 10 S or more and an air permeability of 5 S to 50 S, which is generally used as copy paper, is preferable.

<Image Forming Unit and Image Forming Step>

The image forming unit is not particularly limited as long as the unit is configured to eject an inkjet ink to the recording medium coated with the inkjet treatment liquid so as to form an image, and may be suitably selected in accordance with the intended use.

The image forming step is not particularly limited as long as it is a step of ejecting an inkjet ink to the recording medium coated with the inkjet treatment liquid so as to form an image, and may be suitably selected in accordance with the intended use. For example, the step is a step of applying a stimulus (energy) to the inkjet ink to be jetted onto the recording medium, onto which the treatment liquid has been applied, so as to form an image on the recording medium. As the method of jetting the inkjet ink to the recording medium so as to form an image on a recording medium in the image forming step, any conventionally known inkjet recording methods can be employed. Examples of the methods include inkjet recording methods using a scanning print head, and inkjet recording methods in which a line type print head is used to form an image on a certain sheet of a recording medium.

In the image forming step, the driving method of the recording head serving as an ink jetting unit is not particularly limited. It is possible to use a piezoelectric device actuator using a PZT-based material, a method of effecting thermal energy, and an on-demand type head utilizing an actuator, etc utilizing an electrostatic force, and it is also possible to perform recording with a charge-controllable head of continuous-jetting type. In the method of effecting thermal energy, it is difficult to control jetting of droplets, and images on recording media tend to significantly vary, depending on types of the recording media. However, these problems are solved by applying the treatment liquid to the recording media, and stable, high quality images can be obtained regardless of the types of the recording media.

—Inkjet Ink—

The inkjet ink used for the inkjet recording apparatus and the inkjet recording method may contain a water-dispersible colorant, a water-soluble organic solvent, a surfactant, a penetrant and water, and if necessary, other components.

—Water-Dispersible Colorant—

A pigment is primarily used as a water-dispersible colorant used for the inkjet ink, in view of the weatherability, and, for the purpose of controlling color tone, a dye may be contained in the inkjet ink in the range not impairing the weatherability. The pigment is not particularly limited and may be suitably selected in accordance with the intended use. For example, inorganic pigments and organic pigments for black or color inks are exemplified. These pigments may be used alone or in combination.

Examples of the inorganic pigments include titanium oxide, iron oxide, calcium carbonate, barium sulfate, aluminum hydroxide, barium yellow, cadmium red and chrome yellow. Moreover, it is possible to use carbon blacks produced by a known method such as a contact method, furnace method and thermal method.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, and aniline black. Among these, the pigments having high affinity with water are particularly preferably used.

Specific preferred examples of pigments for black color ink include carbon blacks (e.g., furnace black, lamp black, acetylene black, and channel black (C.I. Pigment Black 7)); metal-based pigments (e.g., copper, iron (C.I. Pigment Black 11), and titanium oxide); and organic pigments (e.g., aniline black (C.I. Pigment Black 1)).

Specific examples of pigments for color ink include C.I. Pigment Yellow 1, 3, 12, 13, 14, 17, 24, 34, 35, 37, 42 (yellow iron oxides), 53, 55, 74, 81, 83, 95, 97, 98, 100, 101, 104, 408, 109, 110, 117, 120, 128, 138, 150, 151, 153 and 183; C.I. Pigment Orange 5, 13, 16, 17, 36, 43, and 51; C.I. Pigment Red 1, 2, 3, 5, 17, 22, 23, 31, 38, 48:2 and 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209 and 219; C.I. Pigment Violet 1 (Rhodamine Lake), 3, 5:1, 16, 19, 23 and 38; C.I. Pigment Blue 1, 2, 15, 15:1, 15:2 and 15:3 (Phthalocyanine Blue), 16, 17:1, 56, 60 and 63; and C.I. Pigment Green 1, 4, 7, 8, 10, 17, 18 and 36.

As preferred embodiments in the case where the water-dispersible colorant is a pigment, the following first and second embodiments are exemplified:

(1) in a first embodiment, the water-dispersible colorant contains a polymer emulsion in which a water-insoluble or sparsely soluble coloring material is contained in polymer fine particles (i.e., a water dispersion of polymer fine particles containing a color material).

(2) in a second embodiment, the water-dispersible colorant contains a pigment having at least one hydrophilic group on its surface and exhibiting water-dispersibility in the absence of a dispersant (hereinafter, also referred to as "self-dispersible pigment".

In the present invention, in the case of the second embodiment, the colorant preferably contains a water-dispersible resin described below.

As the water-dispersible colorant according to the first embodiment, a polymer emulsion obtained by containing a pigment in polymer fine particles is preferably used, in addition to the above-mentioned pigments. The polymer emulsion obtained by containing a pigment in polymer fine particles is an emulsion in which a pigment is encapsulated in polymer fine particles or a pigment is adsorbed on the surface of each of polymer fine particles. In this case, all pigment particles are not necessarily encapsulated in or adsorbed on the surface of the pigment. That is, the pigment may be dispersed in an emulsion in the range not impairing the effects of the present invention. Examples of the polymer forming emulsion (polymer in the polymer fine particles) include vinyl polymers, polyester polymers, and polyurethane polymers. Polymers particularly preferably used are vinyl polymers and polyester polymers. For example, the polymers disclosed in Japanese Patent Application Laid-Open (JP-A) Nos. 2000-53897 and 2001-139849 can be used.

The self-dispersible pigment described in the second embodiment is a pigment whose surface has been modified so that at least one hydrophilic group is, directly or via another atom group, combined with the surface of the pigment. To achieve the surface modification, for example, the following methods are employed: a method in which a specific functional group (functional group such as a sulfone group and a carboxyl group) is chemically combined with the surface of a pigment, or a method in which the surface of a pigment is subjected to wet oxidization treatment using at least one of a hypohalous acid or a salt thereof. Among these methods, a form is particularly preferable in which a carboxyl group is combined with the surface of a pigment and the pigment is dispersed in water. Since the surface of a pigment is modified and a carboxyl group is combined with the surface of the pigment, not only the dispersion stability but also higher print quality can be obtained, and the water resistance of the recording medium after printing is further improved.

An ink containing a self-dispersible pigment according to the second embodiment is excellent in re-dispersibility after being died, and thus the ink allows for suitable and easy recording with a simple cleaning operation, without causing nozzle clogging, even when the cleaning operation is stopped for a long time and water contained in ink near inkjet head nozzles is evaporated. The volume average particle diameter ($D_{50}$) of the self-dispersible pigment is preferably 0.01 μm to 0.16 μm in the inkjet ink.

As the self-dispersible carbon black, a self-dispersible carbon black having ionicity is preferable, and an anionically charged-self-dispersible carbon black is particularly preferable.

Examples of the anionic hydrophilic group include —COOM, —SO$_3$M, —PO$_3$HM, —PO$_3$M$_2$, —SO$_2$NH$_2$, and —SO$_2$NHCOR (where M denotes an alkali metal, ammonium or organic ammonium; and R denotes an alkyl group having 1 to 12 carbon atoms, a phenyl group that may have a substituent or a naphthyl group that may have a substituent). Among these, —COOM, and —SO$_3$M, each of which is combined with the surface of a color pigment, are preferably used.

Examples of the alkali metal denoted by M include lithium, sodium and potassium. Examples of the organic ammonium denoted by M include monomethyl ammonium to trimethyl ammonium, monoethyl ammonium to triethyl ammonium, and monomethanol ammonium to trimethanol ammonium.

As a method of obtaining the anionically charged color pigment, there may be exemplified a method of introducing —COONa into a surface of a color pigment, a method of sulfonating a surface of a color pigment, and a method in which a color pigment is reacted with the diazonium salt.

As the method of introducing —COONa on a surface of the color pigment, for example, a method of subjecting the color pigment to oxidation treatment is used.

The hydrophilic group may be combined with the surface of carbon black via another atom group. Examples of the another atom group include an alkyl group having 1 to 12 carbon atoms, a phenyl group that may have a substituent and a naphthyl group that may have a substituent. Specific examples of the hydrophilic group having the another atom group include —$C_2H_4$COOM (where M denotes an alkali metal or a quaternary ammonium), and —PhSO$_3$M (where Ph denotes a phenyl group; and M denotes an alkali metal or a quaternary ammonium).

The amount of the colorant contained in the inkjet ink, as a solid content, is preferably 2% by mass to 15% by mass, and more preferably 3% by mass to 12% by mass. When the amount of the colorant is less than 2% by mass, the color developing ability and image density of the ink may degrade. When it is more than 15% by mass, the viscosity of the ink is increased, causing degradation in ink ejection stability.

—Water-Soluble Organic Solvent—

As a water-soluble organic solvent for use in the inkjet ink, the water-soluble organic solvent for use in the inkjet treatment liquid is preferably used. A mass ratio of the water-dispersible colorant to the water-soluble organic solvent in the inkjet ink affects the ejection stability of ink ejected from an inkjet head. For example, when the addition amount of the water-soluble organic solvent is low regardless of high solid content of the water-dispersible colorant, evaporation of water near the ink meniscus of nozzles proceeds, and ejection defects may be caused. The amount of the water-soluble organic solvent contained in the inkjet ink is preferably 20% by mass to 50% by mass, and more preferably 20% by mass to 45% by mass. When amount of the water-soluble organic solvent is less than 20% by mass, the ejection stability may degrade and waste ink may adhere to instruments used to maintain the inkjet recording apparatus. In contrast, when the amount of the water-soluble organic solvent is more than 50% by mass, the drying properties of ink printed on paper may degrade, and further the quality of characters printed on plain paper may degrade.

—Surfactant—

As a surfactant for use in the inkjet ink, preferred is a surfactant having a low surface tension and high permeability and high leveling properties, without impairing its dispersion stability depending on the type of colorants used and a combination with the water-soluble organic solvent used. Examples of such a surfactant include at least one selected from anionic surfactants, nonionic surfactants, silicone surfactants and fluorochemical surfactants. Among these, silicone surfactants, and fluorochemical surfactants are particularly preferable. The surfactants can be used alone or in combination.

As the surfactant for use in the inkjet ink, the surfactant for use in the treatment liquid is preferably used.

The amount of the surfactant contained in the inkjet ink is preferably 0.01% by mass to 3.0% by mass, and more preferably 0.5% by mass to 2% by mass. When the amount of the surfactant is less than 0.01% by mass, the effect of adding the surfactant may not be obtained. When it is more than 3.0% by mass, the permeability to recording media may be higher than necessary, possibly causing a degradation of image density and occurrence of ink-strike-through.

—Penetrant—

As the penetrant for use in the inkjet ink, the penetrant for use in the inkjet treatment liquid is preferably used. The amount of the penetrant contained in the inkjet ink is preferably 0.1% by mass to 4.0% by mass. When the amount of the penetrant is less than 0.1% by mass, quick-drying properties may not be obtained, possibly causing image bleeding. When it is more than 4.0% by mass, the dispersion stability of colorants may be impaired, easily causing nozzle clogging, and the permeability to recording media may be higher than necessary, possibly causing a degradation of image density and occurrence of ink-strike-through.

—Water-Dispersible Resin—

As the water-dispersible resin used in the inkjet ink, a water-dispersible resin excellent in film formability (image formability) and having high water repellency, high water resistance, and high weatherability is useful in recording images having high water resistance and high image density (high color developing ability). Examples of the water-dispersible resin include condensed synthetic resins, addition synthetic resins and natural polymer compounds.

Examples of the condensed synthetic resins include polyester resins, polyurethane resins, polyepoxy resins, polyamide resins, polyether resins, poly(meth)acrylic resins, acryl-silicone resins, fluororesins.

Examples of the addition synthetic resins include polyolefin resins, polystyrene resins, polyvinyl alcohol resins, polyvinyl ester resins, polyacrylic acid resins, and unsaturated carboxylic acid resins. Examples of the natural polymer compounds include celluloses, rosins, and natural rubbers.

Among these, particularly, polyurethane resin fine particles, acryl-silicone resin fine particles, and fluorine fine particles are preferable. Two or more of these water-dispersible resins may be used in combination, without any particular problems.

As the fluororesin, fluororesin fine particles each having a fluoroolefin unit are preferable. Among these, fluorine-containing vinylether resin fine particles containing a fluoroolefin unit and a vinylether unit are particularly preferable.

The fluoroolefin unit is not particularly limited and may be suitably selected in accordance with the intended use. Examples thereof include —$CF_2CF_2$—, —$CF_2CF(CF_3)$—, and —$CF_2CFCl$—.

The vinylether unit is not particularly limited and may be suitably selected in accordance with the intended use. For example, compounds each represented by the following structural formula are exemplified.

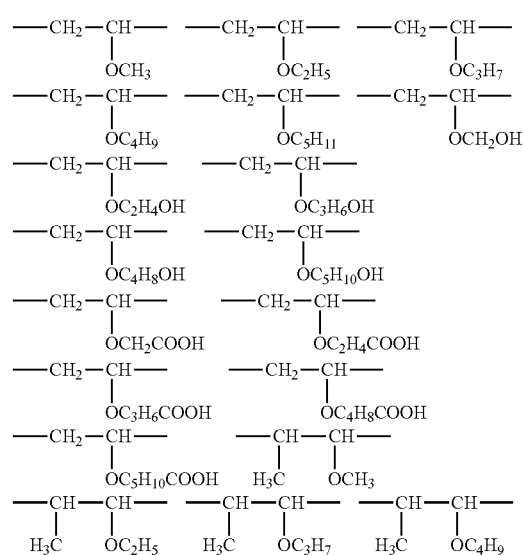

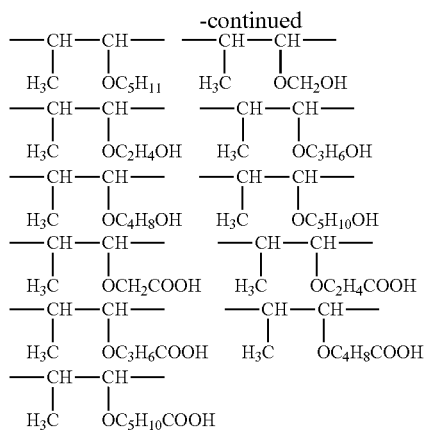

As the fluorine-containing vinylether resin fine particles each containing a fluoroolefin unit and a vinylether unit, an alternated copolymer, in which the fluoroolefin unit and the vinylether unit are alternately copolymerized, is preferable.

As such fluororesin fine particles, a suitably synthesized compound may be used and a commercially available product may be used. Examples of the commercially available products include FLUONATE FEM-500 and FEM-600, DIC-GUARD F-52S, F-90, F-90M, F-90N and AQUAFURFU-RAN TE-5A manufactured by Dainippon Ink Chemical Industries Co., Ltd.; LUMIFLON FE4300, FE4500, FE4400, ASAHI GUARD AG-7105, AG-950, AG-7600, AG-7000, and AG-1100 manufactured by Asahi Glass Co., Ltd.

The water-dispersible resin may be used in the form of a homopolymer, or a copolymer as a composite resin, and water-dispersible resins each having a monophase structure or core-shell structure and those prepared by power-feed emulsion may be used.

As the water-dispersible resin, it is possible to use a resin itself having a hydrophilic group and self-dispersibility, and a resin itself having no dispersibility but to which the dispersibility is imparted with use of a surfactant and another resin having a hydrophilic group. Among these resins, an ionomer of a polyester resin or a polyurethane resin, or an emulsion of resin fine particles obtained by emulsification polymerization or suspension polymerization of an unsaturated monomer is most suitably used. In the case of emulsification polymerization of the unsaturated monomer, a resin emulsion is obtained by reacting water into which an unsaturated monomer, a polymerization initiator, a surfactant, a chain transfer agent, a chelating agent and a pH adjustor are added. Thus, a water-dispersible resin can be easily obtained, and desired properties are easily obtained because the resin components can be changed.

As the unsaturated monomer, unsaturated carboxylic acids, monofunctional or polyfunctional (meth)acrylic acid ester monomers, (meth)acrylic acid amide monomers, aromatic vinyl monomers, vinyl cyano compound monomers, vinyl monomers, allyl compound monomers, olefin monomers, diene monomers, and oligomers having unsaturated carbons may be used alone or in combination. By combining these monomers, properties of the resulting resin can be flexibly modified. The properties of the resulting resin can also be modified with use of an oligomer type polymerization initiator, through a polymerization reaction or graft reaction.

Examples of the unsaturated carboxylic acids include acrylic acids, methacrylic acid, itaconic acids, fumaric acids, and maleic acids.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salt, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyltrimethoxy ammonium salt.

Examples of the polyfunctional (meth)acrylic acid monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylolpropane trimethacrylate, trimethylolethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane, trimethylolpropane triacrylate, trimethylolethane triacrylate, tetramethylolmethane triacrylate, ditrimethylol tetraacrylate, tetramethylolmethane tetraacrylate, pentaerythritol tetraacrylate, and dipentaerythritol hexaacrylate.

Examples of the (meth)acrylic acid amide monomers include acrylamide, methacrylamide, N,N-dimethyacrylamide, methylene-bis-acrylamide, and 2-acrylamide-2-methylpropane sulfonic acid.

Examples of the aromatic vinyl monomers include styrene, α-methylstyrene, vinyltoluene, 4-t-butylstyrene, chlorostyrene, vinylanisole, vinylnaphthalene, and divinylbenzene.

Examples of the vinyl cyano compound monomers include acrylonitrile, and methacrylonitrile.

Examples of the vinyl monomers include vinyl acetate, vinylidene chloride, vinyl chloride, vinyl ether, vinyl ketone, vinylpyrrolidone, vinyl sulfonic acid or salts thereof, vinyltrimethoxysilane, and vinyltriethoxysilane.

Examples of the allyl compound monomers include allylsulfonic acid or salts thereof, allylamine, ally chloride, diallylamine, and diallyldimethylammonium salts.

Examples of the olefin monomers include ethylene, and propylene.

Examples of the diene monomers include butadiene, and chloroprene.

Examples of the oligomers having unsaturated carbon atoms include styrene oligomers having methacryloyl groups, styrene-acrylonitrile oligomers having methacryloyl groups, methyl methacrylate oligomers having methacryloyl groups, dimethyl siloxane oligomers having methacryloyl groups, and polyester oligomers having acryloyl groups.

The water-dispersible resin suffers from breakage of the molecular chains, such as dispersion breakage and hydrolysis, in the presence of a strong alkali or strong acid, and thus the pH of the water-dispersible resin is preferably 4 to 12, and particularly, from the view point of miscibility with water dispersible colorants, it is more preferably 6 to 11, and still more preferably 7 to 9.

The average particle diameter ($D_{50}$) of the water-dispersible resin is relevant to the viscosity of the dispersion liquid. In the case of water-dispersible resins having the same composition, the smaller the particle diameter becomes, the higher the viscosity is at the same solid content. The average particle diameter ($D_{50}$) of the water-dispersible resin is preferably 50 nm or greater to prevent the resulting ink from having excessively high viscosity. When the average particle diameter is several tens micrometers, the water-dispersible resin cannot be used because the diameter of the water-dispersible resin is greater than that of nozzle holes of an inkjet head. When the diameter of the water-dispersible resin is smaller than that of nozzle holes but particles having large particle diameters are present in an ink, the ink ejection stability degrades. In order not to impair the ink ejection stability, the average particle diameter ($D_{50}$) of the water-dispersible resin is preferably 200 nm or smaller, and more preferably 150 nm or smaller.

The water-dispersible resin preferably has a function to fix the water-dispersible colorant on the surface of paper, to form a coat at normal temperature and to improve fixability of a coloring material. Therefore, the minimum film forming temperature (MFT) of the water-dispersible resin is preferably 30° C. or lower. Further, the glass transition temperature of the water-dispersible resin is −40° C. or lower, tucks occur in printed matters because of the increased viscosity of the resin coat. Thus, the water-dispersible resin preferably has a glass transition temperature of −30° C. or higher.

The amount of the water-dispersible resin contained in the inkjet ink, as a solid content, is preferably 1% by mass to 15% by mass, and more preferably 2% by mass to 7% by mass.

The solid content of the inkjet ink can be determined by a method of separating only the water-dispersible colorant and the water-dispersible resin from the inkjet ink. In addition, when a pigment is used as the water-dispersible colorant, a mass reduction ratio of the resulting inkjet ink is evaluated through a thermal mass analysis, thereby making it possible to measure a mass ratio between the water-dispersible colorant and the water-dispersible resin. When the molecular structure of the water-dispersible colorant is apparently known, in the case where the colorant is a pigment or dye, it is possible to determine the solid content of the colorant using the NMR; in the case where the colorant is an inorganic pigment contained in heavy metal atoms and molecular skeleton, or a metal-containing organic pigment or metal-containing dye, the solid content of the colorant can be determined using the fluorescent X-ray analysis.

—Other Components—

The other components for use in the inkjet ink are not particularly limited and may be suitably selected as required. Examples thereof include a pH adjustor, an antiseptic/antifungal agent, a chelating reagent, an anticorrosive, an antioxidant, an ultraviolet absorber, an oxygen absorber, and a light stabilizer.

—pH Adjustor—

The pH adjustor is not particularly limited, as long as the pH of the inkjet ink to be prepared can be adjusted to 7 to 11 without adversely affecting the ink, and may be suitably selected in accordance with the intended use. Examples of the pH adjustor include alcohol amines, hydroxides of alkali metal elements, hydroxides of ammonium, phosphonium hydroxides, and carbonates of alkali metals. When the pH of the inkjet ink is lower than 7 or higher than 11, problems such as degeneration and leakage of ink and ejection defects may occur due to the large amount of ink dissolving an inkjet head and an ink supply unit used.

Examples of the alcohol amines include diethanol amine, triethanol amine, and 2-amino-2-ethyl-1,3-propanediol.

Examples of the hydroxides of alkali metal elements include lithium hydroxide, sodium hydroxide, and potassium hydroxide.

Examples of the hydroxides of ammonium include ammonium hydroxide, quaternary ammonium hydroxide, and quaternary phosphonium hydroxide.

Examples of the carbonates of alkali metals include lithium carbonate, sodium carbonate, and potassium carbonate.

—Antiseptic/Antifungal Agent—

Examples of the antiseptic/antifungal agent include sodium dehydroacetate, sodium sorbate, sodium 2-pyridinethiol-1-oxide, sodium benzoate, and sodium pentachlorophenol.

—Chelate Reagent—

Examples of the chelate reagent include sodium ethylenediamine tetraacetate, sodium nitrilotriacetate, sodium hydroxyethylethylenediamine triacetate, sodium diethylentriamine pentaacetate, and sodium uramil diacetate.

—Anticorrosive Agent—

Examples of the anticorrosive agent include acid sulfite, sodium thiosulfate, thiodiglycolic acid ammonium, diisopropyl ammonium nitrate, pentaerythritol tetranitrate, and dicyclohexyl ammonium nitrate.

—Antioxidant—

Examples of the antioxidant include phenolic antioxidants (including hindered phenolic antioxidant), amine antioxidants, sulfuric antioxidants, and phosphoric antioxidants.

—Ultraviolet Absorber—

Examples of the ultraviolet absorber include benzophenone ultraviolet absorbers, benzotriazole ultraviolet absorbers, salicylate ultraviolet absorbers, cyanoacrylate ultraviolet absorbers, and nickel complex salt ultraviolet absorbers.

—Production Method of Inkjet Ink—

The inkjet ink is produced according to the following procedure: the water-dispersible colorant, the water-soluble organic solvent, the surfactant, the penetrant and water, and if necessary, other components are dispersed or dissolved in an aqueous medium, and further if necessary, the mixed dispersion or solution is stirred and mixed. The stirring and mixing can be carried out by a sand mill, homogenizer, ball mill, paint shaker, ultrasonic wave dispersing machine, or the like. The stirring and mixing can also be carried out with a stirring device using an ordinary stirring blade, a magnetic stirrer, a high-speed dispersing device, or the like.

—Physical Properties of Inkjet Ink—

Physical properties of the inkjet ink are not particularly limited and may be suitably adjusted in accordance with the intended use. For example, the viscosity and surface tension of the ink are preferably in the following ranges.

The viscosity of the inkjet ink at 25° C. is preferably 5 mPa·s to 20 mPa·s. By adjusting the viscosity of the ink to 5 mPa·s or higher, the effect of improving the print density and character quality can be obtained. In contrast, by suppressing the viscosity of the ink to be 20 mPa·s or lower, excellent ink ejection stability can be ensured. Here, the viscosity can be measured, for example, by a viscometer (RE-5504 manufactured by TOM SANGYO Co., Ltd.) at a temperature of 25° C.

The static surface tension of the inkjet ink at 25° C. is preferably 20 mN/m to 35 mN/m, and more preferably 20 mN/m to 30 mN/m. When the static surface tension is in the range of 20 mN/m to 35 mN/m, the permeability of the ink to recording media is increased, leading to a reduction of ink bleeding and an improvement in drying properties of ink printed on plain paper. Therefore, since a recording medium coated with the inkjet treatment liquid is easily wetted with the inkjet ink, the color developing ability is improved and the occurrence of white spots can be reduced. When the static surface tension is more than 35 mN/m, leveling of ink printed on a recording medium coated with the inkjet treatment liquid is difficult to occur, which may take a longer time to dry the ink printed on the recording material.

Coloring of the inkjet ink is not particularly limited and may be suitably adjusted in accordance with the intended use. Examples of the color include yellow, magenta, cyan, and black. When recording is performed using an ink set composed of at least two of the colors used in combination, a multi-color image can be formed. When recording is performed using an ink set composed of all the colors used in combination, a full-color image can be formed.

The inkjet ink of the present invention can be suitably used for printers equipped with any of the following inkjet heads: the piezo type in which ink droplets are ejected by deforming a diaphragm that forms a wall surface of an ink flow path, with the use of a piezoelectric element as a pressure generating unit that pressurizes ink in the ink flow path, and thusly changing the volume of the ink flow path (refer to JP-A No. 02-51734); the thermal type in which bubbles are generated by heating ink in an ink flow path with the use of an exothermic resistive element (refer to JP-A No. 61-59911); and the electrostatic type in which ink droplets are ejected by placing a diaphragm, which form a wall surface of an ink flow path and an electrode, to face each other, then deforming the diaphragm by electrostatic force generated between the diaphragm and the electrode, and thusly changing the volume of the ink flow path (refer to JP-A No. 06-71882).

The inkjet ink can be used in a printer having a function of encouraging printing fixation by heating recording media and the inkjet ink at a temperature of 50° C. to 200° C., during, before or after printing.

The following describes an apparatus for forming an image with the inkjet ink by applying the inkjet treatment liquid of the present invention onto a recording medium with reference to a specific example shown in FIG. 1. The apparatus shown in FIG. 1 is a scanning type image forming apparatus configured to scan the surface of a recording medium using an inkjet recording head.

In the inkjet recording apparatus shown in FIG. 1, a recording medium 6 is fed by a paper feed roller 7, and an inkjet treatment liquid 1 is uniformly thinly applied to the recording medium 6 by an ink application roller 4 and a counter roller 5. The inkjet treatment liquid 1 is scooped up by a scoop roller 3, and uniformly applied to the surface of the ink application roller 4 by a film thickness control roller 2. The recording medium 6 with the inkjet treatment liquid 1 applied to its surface is conveyed to a record scanning section where an inkjet recording head 20 is located. The length of a paper-conveying path from the end point of the inkjet treatment liquid-applying-operation section (A section in FIG. 1) to the start point of the record scanning section (B section in FIG. 1) is designed to be longer than the length of the recording medium 6 in the paper feeding direction, and thus at the point in time when the recording medium 6 reaches the start point of the record scanning section, application of the inkjet treatment liquid 1 can be completely finished. In this case, since application of the inkjet treatment liquid 1 can be implemented before the inkjet recording head 20 starts scanning for printing and the recording medium 6 is intermittently conveyed, the inkjet treatment liquid 1 can be continuously applied with uniformity onto the recording medium 6 at a constant conveyance speed of the recording medium 6. Note that the exemplary apparatus illustrated in FIG. 1 is designed so that the recording medium 6 requiring treatment is supplied from the lower paper cassette and a recording medium 17 which is unnecessary to be treated or should not be treated is supplied from the upper paper cassette, it is convenient to provide a long paper-conveying path for conveying recording media.

The inkjet recording apparatus shown in FIG. 1 has a paper feeding tray 8, a paper feeding roller 10, a recording medium feeding rollers 11 to 16, a paper feeding roller 18, an ink cartridge 21, a carriage axis 22, and a carriage 23.

Figure 2:
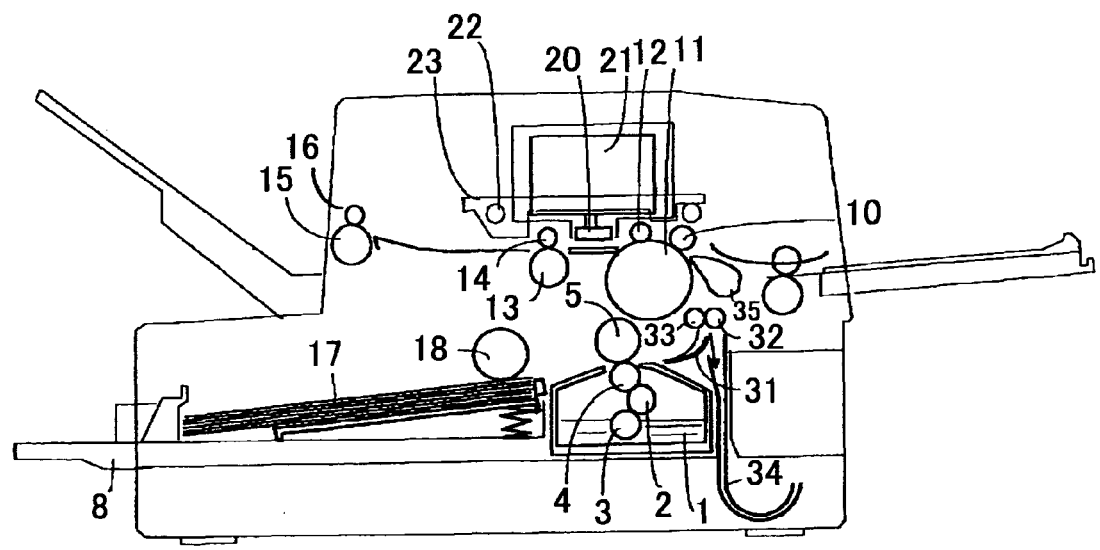
FIG. 2 is a schematic view showing another example of a recording apparatus using an inkjet treatment liquid of the present invention.

FIG. 2 shows another specific example of an apparatus for use in carrying out an image recording method according to the present invention. The apparatus shown in FIG. 2 is also a scanning type image forming apparatus configured to scan the surface of a recording medium using an inkjet recording head. This apparatus is an exemplary image recording apparatus constructed to be more compact than the apparatus shown in FIG. 1. A recording medium 17 is fed by a paper feed roller 18, and an inkjet treatment liquid 1 is uniformly thinly applied to the recording medium 17 by an ink application roller 4 and a counter roller 5. The inkjet treatment liquid 1 is scooped up by a scoop roller 3, and uniformly applied to the surface of the ink application roller 4 by a film thickness control roller 2. With being applied with the inkjet treatment liquid 1, the recording medium 17 passes a record scanning section where an inkjet recording head 20 is located, and is conveyed until application of the inkjet treatment liquid 1 on the recoating medium 17 is completed. At the point in time when application of the inkjet treatment liquid 1 on the recording medium 17 is completed, the recording medium 17 is again returned to the record scanning section until the front end of the recording medium 17 reaches the start point of the record scanning section. Whether or not application of the inkjet treatment liquid is completed can be detected by providing a known recording-medium detection unit (not shown) near the outlet of an inkjet treatment liquid application unit. This detection unit is not necessarily provided, and the apparatus may have a system configuration where information of the length of recording medium is previously input in a controller, and the feed per revolution of the outer periphery of a recording medium conveying roller corresponds to the length of the recording medium by controlling the number of revolutions of a motor.

The recording medium 17 with the inkjet treatment liquid 1 applied to its surface is conveyed again to the record scanning section before the inkjet treatment liquid 1 is dried and solidified. At this time, the recording medium 17 is intermittently conveyed again to the record scanning section at the right moment of scanning operation of the inkjet recording head 20. If a recording medium is returned to the same path through which it is first conveyed, the rear end of the recording medium is reversely entered into the inkjet treatment liquid application unit, possibly causing defects such as non-uniform coating and jam of a recording medium. When a recording medium is returned backward, the direction thereof is switched by a recording medium guide 31. That is, when the recording medium 17 is conveyed backward after being applied with the inkjet treatment liquid 1, a recording medium guide 31 is moved by a known unit such as a solenoid and a motor to the position indicated with a dotted line in the figure. With this configuration, the recording medium 17 is conveyed to the position where a recording medium return guide 34, and thus it is possible to prevent smear of recording medium 17 and paper jam.

The inkjet recording apparatus shown in FIG. 2 has a paper feeding tray 8, a paper feeding roller 10, recording medium feeding rollers 11 to 16, a paper feeding roller 18, an ink cartridge 21, a carriage axis 22, carriage 23, recording medium feeding rollers 32 and 33, a recording medium return guide 34, and a paper feeding guide 35.

Preferably, the treatment step is continuously performed at a constant linear speed of 10 mm/s to 1,000 mm/s. For this reason, in this exemplary apparatus, a recording medium in a sheet form is used, as for a certain sheet of the recording medium, a step of recording an image on the recording medium by an inkjet recording method is started after completion of a step of applying an inkjet treatment liquid onto the certain sheet of a recording medium. In most cases, in such image recording apparatuses, the speed of applying an inkjet treatment liquid does not correspond to the speed of image recording, and thus there is a time difference from a time when an inkjet treatment liquid is applied onto a recording medium to a time when an image is recorded thereon, between the record starting portion of the certain sheet and the record end portion thereof. Even if the time difference is significant, it is possible to substantially prevent evaporation of water from the inkjet treatment liquid having a higher boiling point than that of water, containing a large amount of a hydrophilic solvent with a low evaporation rate and having a water ratio close to an equilibrium water content in the air under an environment where a printer is used. Therefore, the difference in image quality caused between the recording start portion and the recording end portion of the sheet of the recording medium can be lowered to at least the level or lower where such a difference can be visually observed.

As is evident from the conveying process of a recording medium in this apparatus, in most cases, a recording medium is necessary to be conveyed with members in contact with the recording medium coated with an inkjet treatment liquid, such as rollers, roller bearings, and guides, after application of the inkjet treatment liquid onto the recording medium. In this case, if the inkjet treatment liquid applied to a recording medium is transferred to conveying members of the recording medium, conveying functions may be damaged, and smear may accumulate thereon, causing degradation of image quality. The occurrence of the problem can be prevented by using members, for example, a guide of a wave-shaped plate, a spur-shaped roller bearing, and a roller whose surface is made of a water-repellent material.

However, it is desirable that the inkjet treatment liquid applied to a recording medium be quickly absorbed into the recording medium and the surface of recording medium appears dry. To achieve this object, it is effective to adjust the surface tension of the inkjet treatment liquid to 40 mN/m or lower, so that the liquid is quickly absorbed into the recording medium. The "drying and solidifying" of the inkjet treatment liquid that has been applied to a recording medium does not mean that the inkjet treatment liquid is absorbed into the recording medium and the surface of the recording medium appears dry as described above, but means that liquid compounds in the inkjet treatment liquid, such as water, evaporates and cannot maintain a liquid state, followed by solidifying. Even if the inkjet treatment liquid of the present invention is absorbed into a recording medium and the surface thereof appears dry by using the inkjet treatment liquid in a recording apparatus including a combination of an inkjet treatment liquid application unit and an image recording apparatus as described above, inkjet recording can be performed with a state where the inkjet treatment liquid is not actually solidified, and the image quality can be remarkably improved with an extremely small amount of the inkjet treatment liquid to be applied.

In order to control the operation of the inkjet recording apparatuses as shown in FIGS. 1 and 2, when a print order is received by a host machine such as a personal computer, the image forming apparatus (including the inkjet treatment liquid application unit) starts to perform an inkjet treatment liquid application step and a head cleaning step at the same time. After completion of these steps, the image recording apparatus starts to perform an image recording operation. At the data transmitting operation, the image data transmitted per one time may be the data corresponding to one scanning line images, plural scanning line images, or one page images. The head cleaning operation and ink-discharging check operation are not necessarily performed. In addition, it is not necessary to sequentially perform the head cleaning and ink-discharging check operations, and the image data processing and image data transmission operations. Namely, it is possible to start to perform in parallel the inkjet treatment liquid application, head cleaning, ink-discharging check, image data processing and image data transmission operations. By performing these operations in parallel, images can be recorded without substantially deteriorating throughput of the image recording apparatus even when the inkjet treatment liquid application step is performed.

EXAMPLES

Hereinafter, Examples of the present invention will be described in detail, however, these Examples shall not be construed as limiting the scope of the present invention. In Examples a treatment liquid is applied before image formation. However, the treatment liquid may be applied after the image formation or during the image formation.

Preparation Example 1

Preparation of
Magenta-Pigment-Containing-Polymer Fine Particle
Dispersion Liquid>

—Preparation of Polymer Solution A—

In a 1 L-flask equipped with a mechanical stirrer, a thermometer, a nitrogen-inlet tube, a reflux tube and a dropping funnel, which had been sufficiently purged with nitrogen gas, styrene (11.2 g), acrylic acid (2.8 g), lauryl methacrylate (12.0 g), polyethylene glycol methacrylate (4.0 g), styrene macromer (4.0 g), and mercaptoethanol (0.4 g) were added and mixed, and the temperature of the system was increased to 65° C.

Next, a mixed solution of styrene (100.8 g), acrylic acid (25.2 g), lauryl methacrylate (108.0 g), polyethylene glycol methacrylate (36.0 g), hydroxylethyl methacrylate (60.0 g), styrene macromer (36.0 g), mercaptoethanol (3.6 g), azobis methylvaleronitrile (2.4 g), and methyl ethyl ketone (18 g) was added dropwisely into the flask over 2.5 hours. Thereafter, a mixed solution of azobis methylvaleronitrile (0.8 g) and methyl ethyl ketone (18 g) was added dropwisely into the flask for 0.5 hours. After the mixture was aged at 65° C. for 1 hour, azobis methylvaleronitrile (0.8 g) was added thereto, and further aged for 1 hour. Upon completion of the reaction, methyl ethyl ketone (364 g) was added to the flask, to thereby obtain 800 g of a polymer solution A having a concentration of 50% by mass.

—Preparation of Pigment-Containing-Polymer Fine Particle Dispersion Liquid—

The polymer solution A (28 g), C.I. Pigment Red 122 (42 g), a 1 mol/L aqueous potassium hydroxide solution (13.6 g), methyl ethyl ketone (20 g), and ion exchanged water (13.6 g) were sufficiently stirred and then kneaded using a roll mill. After the resulting paste was put into pure water (200 g) and sufficiently stirred, the methyl ethyl ketone and water were distilled away using an evaporator, and the dispersion liquid was pressure filtered through a polyvinylidene fluoride membrane filter having an average pore size of 5.0 μm so as to remove coarse particles therefrom, thereby obtaining a magenta-pigment-containing-polymer fine particle dispersion liquid having a pigment concentration of 15% by mass and a solid content of 20% by mass. An average particle diameter ($D_{50}$) of polymer fine particles in the resulting magenta-pigment-containing-polymer fine particle dispersion liquid was measured and found to be 82.7 nm. The average particle diameter ($D_{50}$) was measured with a particle size distribution measuring device (NANOTRACK UPA-EX150, manufactured by Nikkiso Co., Ltd.).

Preparation Example 2

Preparation of Cyan-Pigment-Containing-Polymer Fine Particle Dispersion Liquid>

A cyan-pigment-containing-polymer fine particle dispersion liquid was prepared in the same manner as in Preparation Example 1, except that as the pigment C.I. Pigment Red 122 was changed to a phthalocyanine pigment (C.I. Pigment Blue 15:3).

An average particle diameter ($D_{50}$) of polymer fine particles in the resulting cyan-pigment-containing-polymer fine particle dispersion liquid was measured with a particle size distribution measuring device (NANOTRACK UPA-EX150, manufactured by Nikki so Co., Ltd.) and found to be 110.6 nm.

Preparation Example 3

Preparation of Yellow-Pigment-Containing-Polymer Fine Particle Dispersion Liquid A yellow-pigment-containing-polymer fine particle dispersion liquid was prepared in the same manner as in Preparation Example 1, except that as the pigment C.I. Pigment Red 122 was changed to a monoazo yellow pigment (C.I. Pigment Yellow 74).

An average particle diameter ($D_{50}$) of polymer fine particles in the resulting yellow-pigment-containing-polymer fine particle dispersion liquid was measured with a particle size distribution measuring device (NANOTRACK UPA-EX150, manufactured by Nikkiso Co., Ltd.) and found to be 105.4 nm.

Preparation Example 4

Preparation of Carbon Black Pigment-Containing-Polymer Fine Particle Dispersion Liquid A carbon black-pigment-containing-polymer fine particle dispersion liquid was prepared in the same manner as in Preparation Example 1, except that as the pigment C.I. Pigment Red 122 was changed to a carbon black (FW100, manufactured by Degussa HULS AG).

An average particle diameter ($D_{50}$) of polymer fine particles in the resulting carbon black-pigment-containing-polymer fine particle dispersion liquid was measured with a particle size distribution measuring device (NANOTRACK UPA-EX150, manufactured by Nikkiso Co., Ltd.) and found to be 75.2 nm.

Preparation Examples 5 to 20

Production of Inkjet Ink

Each inkjet ink was produced in the following manner: First, the water-soluble organic solvent (wetting agent), penetrant, surfactant, antifungal agent and water, each in an amount shown in Tables 1 and 2 below, were mixed, and stirred for 1 hour so as to be mixed uniformly. In addition, depending on the mixture liquid, a water-dispersible resin was added to the mixture liquid, stirred for 1 hour, and a pigment dispersion liquid, an antifoaming agent and a pH adjuster were added thereto, followed by stirring for 1 hour. The resulting dispersion liquid was pressure filtered through a polyvinylidene fluoride membrane filter having an average pore size of 5.0 μm so as to remove coarse particles and dust therefrom, thereby producing inkjet recording inks of Preparation Examples 5 to 20.

TABLE 1

| | Component (% by mass) | Preparation Example | | | | | | | |
|---|---|---|---|---|---|---|---|---|---|
| | | 5 | 6 | 7 | 8 | 9 | 10 | 11 | 12 |
| Pigment | Magenta-pigment-containing-polymer fine particle dispersion liquid (Preparation Example 1) | 33.3 | | | | | | | |
| | Cyan-pigment-containing-polymer fine particle dispersion liquid (Preparation Example 2) | | 33.3 | | | | | | |
| | Yellow-pigment-containing-polymer fine particle dispersion liquid (Preparation Example 3) | | | 33.3 | | | | | |
| | Black-pigment-containing-polymer fine particle dispersion liquid (Preparation Example 4) | | | | 50.0 | | | | |
| | Magenta pigment self-dispersible liquid (CAB-O-JET260) | | | | | 49.0 | | | |
| | Cyan pigment self-dispersible liquid (CAB-O-JET250) | | | | | | 45.0 | | |
| | Yellow pigment self-dispersible liquid (CAB-O-JET270) | | | | | | | 45.0 | |
| | Black pigment self-dispersible liquid (CAB-O-JET300) | | | | | | | | 50.0 |

TABLE 1-continued

|  | Component (% by mass) | Preparation Example | | | | | | | |
|---|---|---|---|---|---|---|---|---|---|
|  |  | 5 | 6 | 7 | 8 | 9 | 10 | 11 | 12 |
| Water-dispersible resin | Fluororesin emulsion |  |  |  |  | 6.0 | 8.0 | 8.0 | 6.0 |
|  | Acryl-silicone resin emulsion |  |  |  |  |  |  |  |  |
| Water-soluble organic solvent | 1,3-butanediol | 21.8 | 26.0 | 26.0 |  | 30.0 | 17.0 | 27.0 |  |
|  | 3-methyl-1,3-butanediol |  |  |  | 16.0 |  |  |  | 16.0 |
|  | 2-pyrrolidone |  |  |  |  |  |  |  | 2.0 |
|  | Glycerin | 14.5 | 13.0 | 13.0 | 16.0 | 10.0 | 17.0 | 9.0 | 16.0 |
| Penetrant | 2-ethyl-1,3-hexanediol | 1.0 | 1.0 | 1.0 | 1.0 | 2.0 | 2.0 | 2.0 | 2.0 |
|  | 2,2,4-trimethyl-1,3-pentanediol | 1.0 | 1.0 | 1.0 | 1.0 |  |  |  |  |
| Surfactant | KF-640 |  |  |  |  | 1.0 | 1.0 | 1.0 | 1.0 |
|  | SOFTANOL EP-7025 | 1.0 | 1.0 | 1.0 | 1.0 |  |  |  |  |
| Antifungal agent | PROXEL GXL | 0.1 | 0.1 | 0.1 | 0.1 | 0.1 | 0.1 | 0.1 | 0.1 |
| Antifoaming agent | Silicone antifoaming agent KM-72F | 0.1 | 0.1 | 0.1 | 0.1 | 0.1 | 0.1 | 0.1 | 0.1 |
| pH adjuster | 2-amino-2-ethyl-1,3-propanediol | 0.3 | 0.3 | 0.3 | 0.3 | 0.3 | 0.3 | 0.3 | 0.3 |
|  | Pure water | 27.0 | 24.3 | 24.3 | 14.6 | 1.6 | 9.6 | 7.6 | 6.6 |
|  | Total (% by mass) | 100 | 100 | 100 | 100 | 100 | 100 | 100 | 100 |

TABLE 2

|  | Component (% by mass) | Preparation Example | | | | | | | |
|---|---|---|---|---|---|---|---|---|---|
|  |  | 13 | 14 | 15 | 16 | 17 | 18 | 19 | 20 |
| Pigment | Cyan pigment dispersion liquid 1 | 33.3 |  |  |  |  |  |  |  |
|  | Magenta pigment dispersion liquid 1 |  | 33.3 |  |  |  |  |  |  |
|  | Yellow pigment dispersion liquid 1 |  |  | 33.3 |  |  |  |  |  |
|  | Black pigment dispersion liquid 1 |  |  |  | 33.3 |  |  |  |  |
|  | Black pigment dispersion liquid 2 |  |  |  |  | 33.3 |  |  |  |
|  | Anionic surfactant dispersed carbon black |  |  |  |  |  | 5.0 |  |  |
|  | Polymer dispersant dispersed carbon black |  |  |  |  |  |  | 5.0 |  |
|  | Anionic microencapsulated carbon black |  |  |  |  |  |  |  | 5.0 |
| Water-dispersible resin | Fluororesin emulsion |  |  |  |  |  |  |  |  |
|  | Acryl-silicone resin emulsion |  |  |  |  |  |  |  |  |
| Water-soluble organic solvent | 2-pyrrolidone |  |  |  |  |  |  | 2.0 |  |
|  | Glycerin | 5.0 | 5.0 | 5.0 | 5.0 |  | 5.0 | 10.0 | 5.0 |
|  | Ethylene glycol |  |  |  |  |  |  |  |  |
|  | Diethylene glycol | 15.0 | 15.0 | 15.0 | 15.0 | 15.0 | 15.0 |  |  |
|  | 1,5-pentanediol |  |  |  |  |  |  |  | 15.0 |
| Penetrant | 2-ethyl-1,3-hexanediol | 2.0 | 2.0 | 2.0 | 2.0 | 1.0 | 2.0 | 1.0 | 1.0 |
|  | 2,2,4-trimethyl-1,3-pentanediol |  |  |  |  |  |  |  |  |
| Surfactant | Sodium polyoxyethylene (3) tridecyl ether acetate (anionic surfactant) | 1.0 | 1.0 | 1.0 | 1.0 |  | 1.0 | 1.0 | 1.0 |
|  | Dialkyl sulfosuccinate |  |  |  |  | 1.0 |  |  |  |
| Antiseptic agent | Sodium benzoate |  |  |  |  |  |  |  | 0.4 |
|  | 1,2-benzisothiazolin-3-one | 0.4 | 0.4 | 0.4 | 0.4 |  |  | 0.4 |  |
|  | Sodium pentachlorophenol |  |  |  |  | 0.4 |  |  |  |
|  | Sodium 2-pyridinethiol-1-oxide |  |  |  |  |  | 0.4 |  |  |
| Antifoaming | Silicone antifoaming agent KM-72F |  |  |  |  |  |  |  |  |
| pH adjuster | 2-amino-2-ethyl-1,3-propanediol | 0.3 | 0.3 | 0.3 | 0.3 | 0.3 | 0.3 | 0.3 | 0.3 |
|  | Pure water | 43.0 | 43.0 | 43.0 | 43.0 | 49.0 | 71.3 | 80.3 | 72.3 |
|  | Total (% by mass) | 100 | 100 | 100 | 100 | 100 | 100 | 100 | 100 |

The abbreviations described in Tables 1 and 2 mean the following:

CAB-O-JET260, manufactured by Cabot Corporation; a solid content: 11%; a magenta self-dispersible pigment CAB-O-JET250, manufactured by Cabot Corporation; a solid content: 11%; a cyan self-dispersible pigment CAB-O-JET270, manufactured by Cabot Corporation; a solid content: 11%; a yellow self-dispersible pigment CAB-O-JET300, manufactured by Cabot Corporation; a solid content: 15%; a black self-dispersible pigment Cyan pigment dispersion liquid 1:

| C.I. Pigment Blue 15:3 (average particle diameter: 123 nm) | 15% by mass |
| Styrene-acrylate-diethanolamine methacrylate copolymer | 3% by mass |
| Pure water | balance |

Magenta pigment dispersion liquid 1:

| C.I. Pigment Red 122 (average particle diameter: 120 nm) | 15% by mass |
| Styrene-acrylate-diethanolamine methacrylate copolymer | 3% by mass |
| Pure water | balance |

Yellow pigment dispersion liquid 1:

| | |
|---|---|
| C.I. Pigment Yellow 74 (average particle diameter: 96 nm) | 15% by mass |
| Formalin naphthalenesulfonate condensate | 3% by mass |
| Pure water | balance |

Black pigment dispersion liquid 1:

| | |
|---|---|
| Carbon black (average particle diameter: 99 nm) | 15% by mass |
| Formalin naphthalenesulfonate condensate | 3% by mass |
| Pure water | balance |

Black pigment dispersion liquid 2:

| | |
|---|---|
| Carbon black (average particle diameter: 99 nm) | 15% by mass |
| Styrene-acrylate-diethanolamine methacrylate copolymer | 3% by mass |
| Pure water | balance |

Anionic surfactant dispersed carbon black: manufactured by Fuji Pigment Co., Ltd.; Fuji SP Black 8031; average particle diameter: 110 nm Polymer dispersant dispersed carbon black: manufactured by Dainichiseika Color & Chemicals Mfg. Co., Ltd.; WA Color Black A-350; average particle diameter: 118 nm Anionic microencapsulated carbon black: manufactured by DIC Corporation; PLASMA; average particle diameter: 125 nm Fluororesin emulsion: manufactured by Asahi Glass Co., Ltd.; LUMIFLON FE4500; solid content: 52% by mass, average particle diameter: 136 nm; minimum filming temperature (MFT)=28° C.

Acryl-silicone resin emulsion: POLYZOL ROY6312, manufactured by Showa High Polymer Co., Ltd.; solid content: 40% by mass, average particle diameter: 171 nm; minimum filming temperature (MFT)=20° C.

KF-640: polyether-modified silicone surfactant: manufactured by Shin-Etsu Chemical Co., Ltd.; component: 100% by mass)

SOFTANOL EP-7025: polyoxyalkylene alkylene ether (manufactured by Nippon Shokubai Co., Ltd.; component: 100% by mass)

PROXEL GXL: antifungal agent containing 1,2-benzisothiazolin-3-one as a main component (manufactured by Avecia Inc.; component: 20% by mass, dipropylene glycol is contained.)

KM-72F: self-emulsified silicone antifoaming agent (manufactured by Shin-Etsu silicone Corp.; component: 100% by mass)

SAN-AI BACK AP: 1,2-benzisothiazolin-3-one (manufactured by SAN-AI OIL CO., LTD.)

Examples 1 to 25 and Comparative Examples 1 to 25

Production of Inkjet Treatment Liquid

An inkjet treatment liquid was produced in the following manner. First, materials as shown in Tables 3 to 7 were mixed, and stirred for 1 hour so as to obtain a uniform mixture. The resulting mixture was pressure filtered through a polyvinylidene fluoride membrane filter having an average pore size of 5.0 μm so as to remove coarse particles and dust therefrom, thereby producing each of the treatment liquids of Examples 1 to 25 and Comparative Examples 1 to 25.

<Storage Stability>

Each of the inkjet treatment liquids of Examples 1 to 25 and Comparative Examples 1 to 25 was placed in a thermostatic bath at 70° C. and left to stand for 2 weeks. Then, the viscosity change ratio between before the inkjet treatment liquid was left to stand and after the inkjet treatment liquid was left to stand was measured. The viscosity of the treatment liquid was measured in the same manner as that of the ink viscosity. The results are shown in Table 3 to 7.

[Evaluation Criteria]
A: The viscosity change was less than 5%.
B: The viscosity change was 5% or more and less than 10%.
C: The viscosity change was 10% or more and less than 20%.
D: The viscosity change was 20% or more.

TABLE 3

| Component (% by mass) | | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|---|
| Water-soluble aliphatic organic acid compound | Lactic acid | 10.0 | 10.0 | | | | | | | 10.0 | |
| | Tartaric acid | | | 10.0 | 10.0 | | | | | | 10.0 |
| Water-soluble organic monoamine compound | 2-amino-2-ethyl-1,3-propanediol | 13.2 | 13.2 | 8.0 | 8.0 | | | | | 13.2 | 8.0 |
| Inorganic metal compound | Magnesium sulfate | | | | | 10.0 | 10.0 | | | | |
| | Calcium chloride | | | | | | | 10.0 | 10.0 | | |
| Water-soluble organic solvent | 1,3-butanediol | 10.0 | | 10.0 | 10.0 | | 10.0 | 10.0 | | 10.0 | 10.0 |
| | 3-methyl-1,3-hexanediol | | 10.0 | 10.0 | | 10.0 | 10.0 | | 10.0 | | |
| | Glycerin | 10.0 | 10.0 | | 10.0 | 10.0 | | 10.0 | 10.0 | 10.0 | 10.0 |
| Penetrant | 2-ethyl-1,3-hexanediol | 2.0 | | 2.0 | | 2.0 | | 2.0 | | 2.0 | |
| | 2,2,4-trimethyl-1,3-pentanediol | | 2.0 | | 2.0 | | 2.0 | | 2.0 | | 2.0 |
| Foam inhibitor | 2,4,7,9-tetramethyldodecane-4,7-diol | 0.4 | | 0.4 | | 0.4 | | 0.4 | | 0.4 | |
| | 2,5,8,11-tetramethyldodecane-5,8-diol | | 0.4 | | 0.4 | | 0.4 | | 0.4 | | 0.4 |
| Fluorochemical surfactant | Compound represented by General Formula (III)-e | 0.5 | | | | | | | | | |
| | Compound represented by General Formula (III)-f | | 0.5 | | | | | | | | |
| | Compound represented by General Formula (III)-s | | | 0.5 | | | | | | | |

TABLE 3-continued

|  | Component (% by mass) | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|---|
|  | Compound represented by General Formula (III)-t |  |  |  | 0.5 |  |  |  |  |  |  |
|  | Compound represented by General Formula (III)-u |  |  |  |  | 0.5 |  |  |  |  |  |
|  | Compound represented by General Formula (IV) |  |  |  |  |  | 0.5 |  |  |  |  |
|  | Compound represented by General Formula (V)-i |  |  |  |  |  |  | 0.5 |  |  |  |
|  | Compound represented by General Formula (IV)-i |  |  |  |  |  |  |  | 0.5 |  |  |
| Antifungal agent | PROXEL GXL | 0.05 | 0.05 | 0.05 | 0.05 | 0.05 | 0.05 | 0.05 | 0.05 | 0.05 | 0.05 |
| Anticorrosive | 1,2,3-benzotriazole | 0.1 | 0.1 | 0.1 | 0.1 | 0.1 | 0.1 | 0.1 | 0.1 | 0.1 | 0.1 |
|  | Pure water | 53.7 | 53.7 | 59.0 | 59.0 | 67.0 | 67.0 | 67.0 | 67.0 | 53.7 | 59.0 |
|  | Total | 100 | 100 | 100 | 100 | 100 | 100 | 100 | 100 | 100 | 100 |
|  | Storage Stability | B | B | A | A | A | A | A | A | B | B |

TABLE 4

|  | Component (% by mass) | Comparative Example 3 | 4 | 5 | 6 | 7 | 8 | 9 | 10 | 11 | 12 |
|---|---|---|---|---|---|---|---|---|---|---|---|
| Water-soluble aliphatic organic acid compound | Lactic acid | 10.0 | 10.0 |  |  |  |  |  |  | 10.0 |  |
|  | Tartaric acid |  |  | 10.0 | 10.0 |  |  |  |  |  | 10.0 |
| Water-soluble organic monoamine compound | 2-amino-2-ethyl-1,3-propanediol | 13.2 | 13.2 | 8.0 | 8.0 |  |  |  |  | 13.2 | 8.0 |
| Inorganic metal compound | Magnesium sulfate |  |  |  |  | 10.0 | 10.0 |  |  |  |  |
|  | Calcium chloride |  |  |  |  |  |  | 10.0 | 10.0 |  |  |
| Water-soluble organic solvent | 1,3-butanediol | 10.0 |  | 10.0 | 10.0 |  | 10.0 | 10.0 |  | 10.0 | 10.0 |
|  | 3-methyl-1,3-hexanediol |  | 10.0 | 10.0 |  | 10.0 | 10.0 |  | 10.0 |  | 10.0 |
|  | Glycerin | 10.0 | 10.0 |  | 10.0 | 10.0 |  | 10.0 | 10.0 | 10.0 |  |
| Penetrant | 2-ethyl-1,3-hexanediol | 2.0 |  | 2.0 |  | 2.0 |  | 2.0 |  | 2.0 | 2.0 |
|  | 2,2,4-trimethyl-1,3-pentanediol |  | 2.0 |  | 2.0 |  | 2.0 |  | 2.0 |  |  |
| Foam inhibitor | BYK-1615 |  |  |  |  |  |  |  |  | 0.4 |  |
|  | KM-72F |  |  |  |  |  |  |  |  |  | 0.4 |
| Fluorochemical surfactant | Compound represented by General Formula (III)-e | 0.5 |  |  |  |  |  |  |  | 0.5 |  |
|  | Compound represented by General Formula (III)-t |  | 0.5 |  |  | 0.5 |  |  |  |  |  |
|  | Compound represented by General Formula (IV) |  |  | 0.5 |  |  | 0.5 |  |  |  | 0.5 |
| Surfactant | OLFINE EXP4001 |  |  |  | 0.5 |  |  |  | 0.5 |  |  |
|  | SOFTANOL EP-7025 |  |  |  |  |  | 0.5 |  |  |  |  |
| Antifungal agent | PROXEL GXL | 0.05 | 0.05 | 0.05 | 0.05 | 0.05 | 0.05 | 0.05 | 0.05 | 0.05 | 0.05 |
| Anticorrosive | 1,2,3-benzotriazole | 0.1 | 0.1 | 0.1 | 0.1 | 0.1 | 0.1 | 0.1 | 0.1 | 0.1 | 0.1 |
|  | Pure water | 54.1 | 54.1 | 59.4 | 59.4 | 67.4 | 67.4 | 67.4 | 67.4 | 54.1 | 59.4 |
|  | Total | 100 | 100 | 100 | 100 | 100 | 100 | 100 | 100 | 100 | 100 |
|  | Storage Stability | B | B | A | A | A | A | B | B | A | B |

TABLE 5

|  | Component (% by mass) | Example 9 | 10 | 11 | 12 | 13 | 14 | 15 | Comparative Example 13 | 14 | 15 |
|---|---|---|---|---|---|---|---|---|---|---|---|
| Water-soluble aliphatic organic acid compound | Lactic acid | 10.0 | 10.0 |  |  |  |  |  | 10.0 |  |  |
|  | Tartaric acid |  |  | 10.0 |  |  |  |  |  |  |  |
|  | Propionic acid |  |  |  | 10.0 | 10.0 |  |  |  | 10.0 |  |
|  | Succinic acid |  |  |  |  |  | 10.0 | 10.0 |  |  | 10.0 |
| Water-soluble organic monoamine compound | 2-amino-2-ethyl-1,3-propanediol |  |  |  | 16.1 | 16.1 | 10.1 | 10.1 |  | 16.1 | 10.1 |
|  | Triethanolamine | 21.1 |  | 7.9 |  |  |  |  | 21.1 |  |  |
|  | Trishydroxymethylaminomethane |  | 29.5 |  |  |  |  |  |  |  |  |
| Water-soluble organic solvent | 1,3-butanediol | 10.0 |  | 10.0 | 10.0 |  | 10.0 | 10.0 |  | 10.0 | 10.0 |
|  | 3-methyl-1,3-hexanediol |  | 10.0 | 10.0 |  | 10.0 | 10.0 |  | 10.0 |  | 10.0 |
|  | Glycerin | 10.0 | 10.0 |  | 10.0 | 10.0 |  | 10.0 | 10.0 | 10.0 |  |

TABLE 5-continued

|  | Component (% by mass) | Example 9 | Example 10 | Example 11 | Example 12 | Example 13 | Example 14 | Example 15 | Comparative Example 13 | Comparative Example 14 | Comparative Example 15 |
|---|---|---|---|---|---|---|---|---|---|---|---|
| Penetrant | 2-ethyl-1,3-hexanediol | 2.0 |  | 2.0 |  | 2.0 |  | 2.0 |  | 2.0 |  |
|  | 2,2,4-trimethyl-1,3-pentanediol |  | 2.0 |  | 2.0 |  | 2.0 |  | 2.0 |  | 2.0 |
| Foam inhibitor | 2,4,7,9-tetramethyldodecane-4,7-diol | 0.4 |  | 0.4 |  | 0.4 |  | 0.4 |  |  |  |
|  | 2,5,8,11-tetramethyldodecane-5,8-diol |  | 0.4 |  | 0.4 |  | 0.4 |  |  |  |  |
| Fluorochemical surfactant | Compound represented by General Formula (III)-e | 0.5 |  |  |  |  |  |  |  |  | 0.5 |
|  | Compound represented by General Formula (III)-f |  | 0.5 |  |  |  |  | 0.5 |  |  |  |
|  | Compound represented by General Formula (III)-s |  |  | 0.5 |  |  |  | 0.5 |  |  |  |
|  | Compound represented by General Formula (III)-t |  |  |  | 0.5 |  |  |  | 0.5 |  |  |
|  | Compound represented by General Formula (III)-u |  |  |  |  | 0.5 |  |  |  | 0.5 |  |
| Antifungal agent | PROXEL GXL | 0.05 | 0.05 | 0.05 | 0.05 | 0.05 | 0.05 | 0.05 | 0.05 | 0.05 | 0.05 |
| Anticorrosive | 1,2,3-benzotriazole | 0.1 | 0.1 | 0.1 | 0.1 | 0.1 | 0.1 | 0.1 | 0.1 | 0.1 | 0.1 |
|  | Pure water | 45.9 | 37.5 | 59.1 | 50.9 | 50.9 | 56.9 | 56.9 | 67.0 | 53.7 | 59.0 |
|  | Total | 100 | 100 | 100 | 100 | 100 | 100 | 100 | 100 | 100 | 100 |
|  | Storage Stability | B | B | B | B | B | B | B | B | B | B |

TABLE 6

|  | Component (% by mass) | Example 16 | Example 17 | Example 18 | Example 19 | Example 20 | Example 21 | Example 22 | Example 23 | Example 24 | Example 25 |
|---|---|---|---|---|---|---|---|---|---|---|---|
| Water-soluble coagulating agent | Ammonium lactate | 15.2 |  |  |  |  |  | 7.6 | 7.6 | 7.6 | 30.3 |
|  | SHALLOL DC902P |  | 19.4 |  |  |  |  |  |  |  |  |
|  | POLYFIX301 |  |  | 33.3 |  |  |  |  |  |  | 16.7 |
|  | ARAFIX 255LOX |  |  |  | 40.0 |  |  | 40.0 |  |  |  |
|  | DK-856 |  |  |  |  | 20.0 |  |  | 20.0 |  |  |
|  | DK-6830 |  |  |  |  |  | 18.2 |  |  | 18.2 |  |
| Water-soluble organic solvent | 1,3-butanediol | 10.0 |  | 10.0 | 10.0 |  | 10.0 | 10.0 |  | 10.0 | 10.0 |
|  | 3-methyl-1,3-hexanediol |  | 10.0 | 10.0 |  | 10.0 | 10.0 |  | 10.0 |  |  |
|  | Glycerin | 10.0 | 10.0 |  | 10.0 | 10.0 |  | 10.0 | 10.0 | 10.0 | 10.0 |
| Penetrant | 2-ethyl-1,3-hexanediol | 2.0 |  | 2.0 |  | 2.0 |  | 2.0 |  | 2.0 |  |
|  | 2,2,4-trimethyl-1,3-pentanediol |  | 2.0 |  | 2.0 |  | 2.0 |  | 2.0 |  | 2.0 |
| Foam inhibitor | 2,4,7,9-tetramethyldodecane-4,7-diol | 0.4 |  | 0.4 |  | 0.4 |  | 0.4 |  | 0.4 |  |
|  | 2,5,8,11-tetramethyldodecane-5,8-diol |  | 0.4 |  | 0.4 |  | 0.4 |  | 0.4 |  | 0.4 |
| Fluorochemical surfactant | Compound represented by General Formula (III)-e | 0.5 |  |  |  |  |  |  |  |  | 0.5 |
|  | Compound represented by General Formula (III)-f |  | 0.5 |  |  |  | 0.5 |  |  |  |  |
|  | Compound represented by General Formula (III)-s |  |  | 0.5 |  |  |  | 0.5 |  |  |  |
|  | Compound represented by General Formula (III)-t |  |  |  | 0.5 |  |  |  | 0.5 |  |  |
|  | Compound represented by General Formula (III)-u |  |  |  |  | 0.5 |  |  |  | 0.5 |  |
| Antifungal | PROXEL GXL | 0.05 | 0.05 | 0.05 | 0.05 | 0.05 | 0.05 | 0.05 | 0.05 | 0.05 | 0.05 |
| Anticorrosive | 1,2,3-benzotriazole | 0.1 | 0.1 | 0.1 | 0.1 | 0.1 | 0.1 | 0.1 | 0.1 | 0.1 | 0.1 |
|  | Pure water | 61.8 | 57.5 | 43.6 | 37.0 | 57.0 | 58.8 | 29.4 | 49.4 | 51.2 | 30.0 |
|  | Total | 100 | 100 | 100 | 100 | 100 | 100 | 100 | 100 | 100 | 100 |
|  | Storage Stability | A | B | B | B | B | B | A | A | A | B |

TABLE 7

|  | Component (% by mass) | Comparative Example 16 | Comparative Example 17 | Comparative Example 18 | Comparative Example 19 | Comparative Example 20 | Comparative Example 21 | Comparative Example 22 | Comparative Example 23 | Comparative Example 24 | Comparative Example 25 |
|---|---|---|---|---|---|---|---|---|---|---|---|
| Water-soluble coagulating agent | Ammonium lactate | 15.2 |  |  |  |  |  | 7.6 | 7.6 | 7.6 | 30.3 |
|  | SHALLOL DC902P |  | 19.4 |  |  |  |  |  |  |  |  |
|  | POLYFIX301 |  |  | 33.3 |  |  |  |  |  |  | 16.7 |

TABLE 7-continued

| Component (% by mass) | | Comparative Example | | | | | | | | | |
|---|---|---|---|---|---|---|---|---|---|---|---|
| | | 16 | 17 | 18 | 19 | 20 | 21 | 22 | 23 | 24 | 25 |
| | ARAFIX 255LOX | | | | 40.0 | | | 40.0 | | | |
| | DK-856 | | | | | 20.0 | | | 20.0 | | |
| | DK-6830 | | | | | | 18.2 | | | 18.2 | |
| Water-soluble organic solvent | 1,3-butanediol | 10.0 | | 10.0 | 10.0 | | 10.0 | 10.0 | | 10.0 | 10.0 |
| | 3-methyl-1,3-hexanediol | | 10.0 | 10.0 | | 10.0 | 10.0 | | 10.0 | | |
| | Glycerin | 10.0 | 10.0 | | 10.0 | 10.0 | | 10.0 | 10.0 | 10.0 | 10.0 |
| Penetrant | 2-ethyl-1,3-hexanediol | 2.0 | | 2.0 | | 2.0 | | 2.0 | | 2.0 | |
| | 2,2,4-trimethyl-1,3-pentanediol | | 2.0 | | 2.0 | | 2.0 | | 2.0 | | 2.0 |
| Foam inhibitor | 2,4,7,9-tetramethyldodecane-4,7-diol | | | | | | | | | | |
| | 2,5,8,11-tetramethyldodecane-5,8-diol | | | | | | | | | | |
| Fluorochemical surfactant | Compound represented by General Formula (III)-e | 0.5 | | | | | | | | | 0.5 |
| | Compound represented by General Formula (III)-f | | 0.5 | | | | 0.5 | | | | |
| | Compound represented by General Formula (III)-s | | | 0.5 | | | | 0.5 | | | |
| | Compound represented by General Formula (III)-t | | | | 0.5 | | | | 0.5 | | |
| | Compound represented by General Formula (III)-u | | | | | 0.5 | | | | 0.5 | |
| Antifungal | PROXEL GXL | 0.05 | 0.05 | 0.05 | 0.05 | 0.05 | 0.05 | 0.05 | 0.05 | 0.05 | 0.05 |
| Anticorrosive | 1,2,3-benzotriazole | 0.1 | 0.1 | 0.1 | 0.1 | 0.1 | 0.1 | 0.1 | 0.1 | 0.1 | 0.1 |
| | Pure water | 62.2 | 57.9 | 44.0 | 37.4 | 57.4 | 59.2 | 29.8 | 49.8 | 51.6 | 30.4 |
| | Total | 100 | 100 | 100 | 100 | 100 | 100 | 100 | 100 | 100 | 100 |
| | Storage Stability | A | B | B | B | B | B | A | A | A | B |

The abbreviations described in Tables 3 to 7 mean the following:

Lactic acid: manufactured by Tokyo Chemical Industry Co., Ltd.; purity: 85% or higher Tartaric acid: manufactured by Kanto Kagaku K.K.; purity: 99.5% or higher Ammonium lactate: manufactured by Musashino Chemical Laboratory, Ltd.; purity: 66%

SHALLOL DC902C: a water-soluble cationic polymer (dimethyl diallyl ammonium chloride homopolymers; manufactured by Dai-ichi Kogyo Seiyaku Co., Ltd.; molecular weight: 9,000; active ingredient: 51.5% by mass)

POLYFIX 301: a water-soluble cationic polymer (polyamide, epichlorohydrin polymer; manufactured by Showa highpolymer Co., Ltd.; molecular weight: 3,000; active ingredient: 30% by mass)

ARAFIX 255LOX: a water-soluble cationic polymer (epichlorohydrin polymer; manufactured by Arakawa Chemical Industries, Ltd.; active ingredient: 25% by mass)

DK-856: a water-soluble cationic polymer (polyamine resin; manufactured by SEIKO PMC CORPORATION; active ingredient: 50% by mass)

DK-6830: a water-soluble cationic polymer (polyamide, epichlorohydrin polymer; manufactured by SEIKO PMC CORPORATION; active ingredient: 55% by mass)

magnesium sulfate: manufactured by Wako Pure Chemical Industries, Ltd.; purity: 98.5% or higher calcium chloride: manufactured by Wako Pure Chemical Industries, Ltd.; purity: 98.5% or higher A compound represented by General Formula (III)-e:

$C_4F_9-CH_2CH(OH)CH_2O-(CH_2CH_2O)_{21}-C_{12}H_{25}$

A compound represented by General Formula (III)-f:

$C_4F_9-CH_2CH(OH)CH_2O-(CH_2CH_2O)_{25}-C_{12}H_{25}$

A compound represented by General. Formula (III)-s:

$C_4F_9-CH_2CH(OH)CH_2O-(CH_2CH_2O)_{23}-CH_2CH(OH)CH_2-C_4F_9$

A compound represented by General Formula (III)-t:

$C_4F_9-CH_2CH(OH)CH_2O-(CH_2CH_2O)_{35}-CH_2CH(OH)CH_2-C_4F_9$

A compound represented by General Formula (III)-u:

$C_4F_9-CH_2CH(OH)CH_2O-(CH_2CH_2O)_{45}-CH_2CH(OH)CH_2-C_4F_9$

A compound represented by General Formula (IV):

ZONYL FS-300: polyoxyethylene perfluoroalkyl ether

In General Formula (IV), J denotes an integer of 6 to 8, and K denotes an integer of 26 to 40.

(manufactured by E.I. du Pont de Nemours & Company; active ingredient: 40% by mass)

A compound represented by General Formula (V)-i:

In General Formula (V)-i, n=4, m=21, p=4, and $Rf=CF_2CF_3$.

*A compound represented by General Formula (VI)-i:

In General Formula (VI)-i, q=6, and $Rf=CF_2CF_3$.

OLFINE EXP4001: acetylene glycol surfactant; manufactured by Nissin Chemical Industry Co., Ltd.; active ingredient: 80% by mass SOFTANOL EP-7025: polyoxyalkylene alkylene ether (manufactured by Nippon Shokubai Co., Ltd.; active ingredient: 100% by mass)

PROXEL GXL: antifungal agent containing 1,2-benzisothiazolin-3-one as a main component (manufactured by Avecia Inc.; component: 20% by mass; dipropylene glycol is contained.)

BYK-1615: silicone antifoaming agent (manufactured by BYK Japan KK; component: 100% by mass)

KM-72F: self-dispersible silicone antifoaming agent (manufactured by Shin-Etsu Chemical Co., Ltd.; component: 100% by mass)

Examples 26 to 58 and Comparative Examples 26 to 50

Image Formation

The inkjet treatment liquids of Examples 1 to 25 and Comparative Examples 1 to 25 were respectively applied to recording media by wire bar coating followed by drying with warm air, or using an apparatus shown in FIG. 2 by roll coating followed by naturally drying. Thereafter, under the environment where the temperature and relative humidity were adjusted to 23° C.±0.5° C. and 50%±5%, respectively, in an inkjet printer IPSIO GX5000 (manufactured by Ricoh Company, Ltd.), the drive voltage of piezo element was varied so as to uniformly discharge an ink and to make the ink adhere in the same amount to each of the recording media.

TABLE 8

|  | Inkjet treatment liquid | Coating amount (g/m²) | Application method | Drying method | Ink set | GX5000 printing mode |
|---|---|---|---|---|---|---|
| Ex. 26 | Ex. 1 | 0.25 | bar coating | Warm air drying | Preparation Ex. 5-8 | Plain paper - standard high speed |
| Ex. 27 | Ex. 2 | 0.25 | bar coating | Warm air drying | Preparation Ex. 5-8 | Plain paper - standard high speed |
| Ex. 28 | Ex. 3 | 0.10 | roll coating | Natural drying | Preparation Ex. 5-8 | Plain paper - standard high speed |
| Ex. 29 | Ex. 4 | 0.10 | roll coating | Natural drying | Preparation Ex. 5-8 | Plain paper - standard high speed |
| Ex. 30 | Ex. 5 | 0.25 | bar coating | Warm air drying | Preparation Ex. 9-12 | Plain paper - standard high speed |
| Ex. 31 | Ex. 6 | 0.25 | bar coating | Warm air drying | Preparation Ex. 9-12 | Plain paper - standard high speed |
| Ex. 32 | Ex. 7 | 0.10 | roll coating | Natural drying | Preparation Ex. 9-12 | Plain paper - standard high speed |
| Ex. 33 | Ex. 8 | 0.10 | roll coating | Natural drying | Preparation Ex. 9-12 | Plain paper - standard high speed |
| Ex. 34 | Ex. 1 | 0.25 | bar coating | Warm air drying | Preparation Ex. 13-16 | Plain paper - standard high speed |
| Ex. 35 | Ex. 2 | 0.25 | bar coating | Warm air drying | Preparation Ex. 13-16 | Plain paper - standard high speed |
| Ex. 36 | Ex. 3 | 0.10 | roll coating | Natural drying | Preparation Ex. 13-16 | Plain paper - standard high speed |
| Ex. 37 | Ex. 4 | 0.10 | roll coating | Natural drying | Preparation Ex. 13-16 | Plain paper - standard high speed |
| Ex. 38 | Ex. 5 | 0.25 | bar coating | Warm air drying | Preparation Ex. 17-20 | Plain paper - standard high speed |
| Ex. 39 | Ex. 6 | 0.25 | bar coating | Warm air drying | Preparation Ex. 17-20 | Plain paper - standard high speed |
| Ex. 40 | Ex. 7 | 0.10 | roll coating | Natural drying | Preparation Ex. 17-20 | Plain paper - standard high speed |
| Ex. 41 | Ex. 8 | 0.10 | roll coating | Natural drying | Preparation Ex. 17-20 | Plain paper - standard high speed |
| Ex. 42 | Ex. 9 | 0.25 | bar coating | Warm air drying | Preparation Ex. 5-8 | Plain paper - standard high speed |
| Ex. 43 | Ex. 10 | 0.25 | bar coating | Warm air drying | Preparation Ex. 5-8 | Plain paper - standard high speed |
| Ex. 44 | Ex. 11 | 0.10 | roll coating | Natural drying | Preparation Ex. 5-8 | Plain paper - standard high speed |
| Ex. 45 | Ex. 12 | 0.10 | roll coating | Natural drying | Preparation Ex. 5-8 | Plain paper - standard high speed |
| Ex. 46 | Ex. 13 | 0.25 | bar coating | Warm air drying | Preparation Ex. 5-8 | Plain paper - standard high speed |
| Ex. 47 | Ex. 14 | 0.25 | bar coating | Warm air drying | Preparation Ex. 5-8 | Plain paper - standard high speed |
| Ex. 48 | Ex. 15 | 0.10 | roll coating | Natural drying | Preparation Ex. 5-8 | Plain paper - standard high speed |
| Ex. 49 | Ex. 16 | 0.10 | roll coating | Natural drying | Preparation Ex. 5-8 | Plain paper - standard high speed |
| Ex. 50 | Ex. 17 | 0.10 | roll coating | Natural drying | Preparation Ex. 5-8 | Plain paper - standard high speed |
| Ex. 51 | Ex. 18 | 0.25 | bar coating | Warm air drying | Preparation Ex. 5-8 | Plain paper - standard high speed |
| Ex. 52 | Ex. 19 | 0.25 | bar coating | Warm air drying | Preparation Ex. 5-8 | Plain paper - standard high speed |
| Ex. 53 | Ex. 20 | 0.10 | roll coating | Natural drying | Preparation Ex. 5-8 | Plain paper - standard high speed |
| Ex. 54 | Ex. 21 | 0.10 | roll coating | Natural drying | Preparation Ex. 5-8 | Plain paper - standard high speed |
| Ex. 55 | Ex. 22 | 0.25 | bar coating | Warm air drying | Preparation Ex. 5-8 | Plain paper - standard high speed |
| Ex. 56 | Ex. 23 | 0.25 | bar coating | Warm air drying | Preparation Ex. 5-8 | Plain paper - standard high speed |
| Ex. 57 | Ex. 24 | 0.10 | roll coating | Natural drying | Preparation Ex. 5-8 | Plain paper - standard high speed |
| Ex. 58 | Ex. 25 | 0.10 | roll coating | Natural drying | Preparation Ex. 5-8 | Plain paper - standard high speed |

TABLE 9

|  | Inkjet treatment liquid | Coating amount (g/m²) | Application method | Drying method | Ink set | GX5000 printing mode |
|---|---|---|---|---|---|---|
| Comp. Ex. 26 | Comp. Ex. 1 | 0.10 | roll coating | Natural drying | Preparation Ex. 5-8 | Plain paper - standard high speed |
| Comp. Ex. 27 | Comp. Ex. 2 | 0.10 | roll coating | Natural drying | Preparation Ex. 5-8 | Plain paper - standard high speed |
| Comp. Ex. 28 | Comp. Ex. 3 | 0.25 | bar coating | Warm air drying | Preparation Ex. 5-8 | Plain paper - standard high speed |
| Comp. Ex. 29 | Comp. Ex. 4 | 0.25 | bar coating | Warm air drying | Preparation Ex. 5-8 | Plain paper - standard high speed |
| Comp. Ex. 30 | Comp. Ex. 5 | 0.10 | roll coating | Natural drying | Preparation Ex. 5-8 | Plain paper - standard high speed |
| Comp. Ex. 31 | Comp. Ex. 6 | 0.10 | roll coating | Natural drying | Preparation Ex. 5-8 | Plain paper - standard high speed |
| Comp. Ex. 32 | Comp. Ex. 7 | 0.25 | bar coating | Warm air drying | Preparation Ex. 9-12 | Plain paper - standard high speed |
| Comp. Ex. 33 | Comp. Ex. 8 | 0.25 | bar coating | Warm air drying | Preparation Ex. 9-12 | Plain paper - standard high speed |
| Comp. Ex. 34 | Comp. Ex. 9 | 0.10 | roll coating | Natural drying | Preparation Ex. 9-12 | Plain paper - standard high speed |
| Comp. Ex. 35 | Comp. Ex. 10 | 0.10 | roll coating | Natural drying | Preparation Ex. 9-12 | Plain paper - standard high speed |
| Comp. Ex. 36 | Comp. Ex. 11 | 0.10 | roll coating | Natural drying | Preparation Ex. 5-8 | Plain paper - standard high speed |
| Comp. Ex. 37 | Comp. Ex. 12 | 0.10 | roll coating | Natural drying | Preparation Ex. 5-8 | Plain paper - standard high speed |
| Comp. Ex. 38 | Comp. Ex. 13 | 0.10 | roll coating | Natural drying | Preparation Ex. 5-8 | Plain paper - standard high speed |
| Comp. Ex. 39 | Comp. Ex. 14 | 0.25 | bar coating | Warm air drying | Preparation Ex. 5-8 | Plain paper - standard high speed |
| Comp. Ex. 40 | Comp. Ex. 15 | 0.25 | bar coating | Warm air drying | Preparation Ex. 5-8 | Plain paper - standard high speed |
| Comp. Ex. 41 | Comp. Ex. 16 | 0.25 | roll coating | Natural drying | Preparation Ex. 5-8 | Plain paper - standard high speed |
| Comp. Ex. 42 | Comp. Ex. 17 | 0.25 | roll coating | Natural drying | Preparation Ex. 5-8 | Plain paper - standard high speed |
| Comp. Ex. 43 | Comp. Ex. 18 | 0.10 | roll coating | Natural drying | Preparation Ex. 5-8 | Plain paper - standard high speed |

TABLE 9-continued

| | Treatment liquid application step | | | | Image forming step | |
|---|---|---|---|---|---|---|
| | Inkjet treatment liquid | Coating amount (g/m²) | Application method | Drying method | Ink set | GX5000 printing mode |
| Comp. Ex. 44 | Comp. Ex. 19 | 0.10 | roll coating | Natural drying | Preparation Ex. 5-8 | Plain paper - standard high speed |
| Comp. Ex. 45 | Comp. Ex. 20 | 0.25 | roll coating | Natural drying | Preparation Ex. 5-8 | Plain paper - standard high speed |
| Comp. Ex. 46 | Comp. Ex. 21 | 0.25 | roll coating | Natural drying | Preparation Ex. 5-8 | Plain paper - standard high speed |
| Comp. Ex. 47 | Comp. Ex. 22 | 0.10 | roll coating | Natural drying | Preparation Ex. 5-8 | Plain paper - standard high speed |
| Comp. Ex. 48 | Comp. Ex. 23 | 0.10 | roll coating | Natural drying | Preparation Ex. 5-8 | Plain paper - standard high speed |
| Comp. Ex. 49 | Comp. Ex. 24 | 0.25 | roll coating | Natural drying | Preparation Ex. 5-8 | Plain paper - standard high speed |
| Comp. Ex. 50 | Comp. Ex. 25 | 0.25 | roll coating | Natural drying | Preparation Ex. 5-8 | Plain paper - standard high speed |

The recording media used in Examples and Comparative Examples are as follows

My_paper: manufactured by Ricoh Company, Ltd.; wood-free paper; basis weight: 69.6 g/m²; sizing: 23.2 sec; air permeability: 21 sec.

<Image Density>

A chart including a 64-point symbol of a solid square image "■" produced using MICROSOFT WORD 2000 was printed on each of recording media, and the image density of the "■" portion on a print surface was measured with a densitometer X-Rite 938 and judged according to the following evaluation criteria. The print mode was set to "Plain Paper—Standard High Speed" mode and color matching-off-mode by using a driver attached to a printer.

[Color specification of "■" portion]
Black: (R)0, (G)0, (B)0
Yellow: (R)255, (G)255, (B)0
Magenta: (R)255, (G)0, (B)255
Cyan: (R)0, (G)0, (B)255

[Evaluation Criteria]
A: Black: 1.3 or higher, Yellow: 0.85 or higher, Magenta: 1.05 or higher, Cyan: 1.1 or higher,
B: Black: 1.2 or higher and lower than 1.3, Yellow: 0.8 or higher and lower than 0.85, Magenta: 1.0 or higher and lower than 1.05, Cyan: 1.0 or higher and lower than 1.1
C: Black: 1.15 or higher and lower than 1.2, Yellow: 0.75 or higher and lower than 0.8, Magenta: 0.95 or higher and lower than 1.0, Cyan: 0.95 or higher and lower than 1.0
D: Black: lower than 1.15, Yellow: lower than 0.75, Magenta: lower than 0.95, Cyan: lower than 0.95

<Image Color Saturation>

A chart similar to that used in the evaluation of the image density described above was printed on each of recording media. The image color saturation of the symbol "■" portion on a print surface was measured with the X-RITE 938, and judged according to the following evaluation criteria. The print mode was set to "Plain Paper—Standard High Speed" mode and color matching-off-mode by using a driver attached to a printer.

A ratio (measured value/color saturation value of standard color) of a measured value of color saturation to a color saturation value of standard color (Japan color ver. 2) (Yellow: 91.34, Magenta: 74.55, Cyan: 62.82) was calculated and evaluated based on the following evaluation criteria.

[Evaluation Criteria]
A: 0.85 or higher
B: 0.8 or higher and lower than 0.85
C: 0.75 or higher and lower than 0.8
D: lower than 0.75

<Color Unevenness>

A chart including a hollow square image "□" portion in a size of 198 mm width×65 mm height produced using MICROSOFT WORD 2000 was printed on each of recording media, and 20 points of the printed hollow square image "□" portion were measured using the densitometer X-Rite 938, calculated by the following equation, and judged according to the following evaluation criteria. The print mode was set to "Plain Paper—Standard High Speed" mode and color matching-off-mode by using a driver attached to a printer.

Judgment value=((maximum value)−(minimum value))/(average value)

[Color specification of "□" portion]
Black: (R)192, (G)192, (B)192
Yellow: (R)255, (G)255, (B)153
Magenta: (R)255, (G)153, (B)255
Cyan: (R)153, (G)153, (B)255

[Evaluation Criteria]
A: lower than 0.10
B: 0.10 or higher and lower than 0.15
C: 0.15 or higher The results are shown in Tables 10 to 12. Note that the above-mentioned physical properties were evaluated with respect to each color ink, based on the evaluation criteria. Consequently, as for the result of each image quality, the most common evaluation judgments were described in Tables. In the case where the evaluation judgments were the same numbers, the better result was descried in Tables.

TABLE 10

| | Image quality | | |
|---|---|---|---|
| | Image density | Image color saturation | Color unevenness |
| Ex. 26 | A | A | A |
| Ex. 27 | A | A | A |
| Ex. 28 | A | A | B |
| Ex. 29 | A | A | B |
| Ex. 30 | A | A | A |
| Ex. 31 | A | A | A |
| Ex. 32 | B | B | A |
| Ex. 33 | B | B | A |
| Ex. 34 | A | A | B |
| Ex. 35 | A | A | B |
| Ex. 36 | A | A | B |
| Ex. 37 | A | A | B |
| Ex. 38 | A | A | B |
| Ex. 39 | A | A | B |
| Ex. 40 | A | A | B |
| Ex. 41 | A | A | B |

TABLE 11

| | Image quality | | |
|---|---|---|---|
| | Image density | Image color saturation | Color unevenness |
| Ex. 42 | A | A | A |
| Ex. 43 | A | A | A |
| Ex. 44 | A | A | B |
| Ex. 45 | A | A | B |
| Ex. 46 | A | A | B |
| Ex. 47 | A | A | B |
| Ex. 48 | A | A | B |
| Ex. 49 | A | A | A |
| Ex. 50 | A | A | B |
| Ex. 51 | A | A | B |
| Ex. 52 | A | A | B |
| Ex. 53 | A | A | B |
| Ex. 54 | A | A | B |
| Ex. 55 | A | A | A |
| Ex. 56 | A | A | A |
| Ex. 57 | A | A | A |
| Ex. 58 | A | A | B |

TABLE 12

| | Image quality | | |
|---|---|---|---|
| | Image density | Image color saturation | Color unevenness |
| Comp. Ex. 26 | A | A | C |
| Comp. Ex. 27 | A | A | C |
| Comp. Ex. 28 | A | A | C |
| Comp. Ex. 29 | A | A | C |
| Comp. Ex. 30 | A | A | C |
| Comp. Ex. 31 | A | A | C |
| Comp. Ex. 32 | A | A | C |
| Comp. Ex. 33 | B | B | C |
| Comp. Ex. 34 | A | A | C |
| Comp. Ex. 35 | B | B | C |
| Comp. Ex. 36 | A | A | C |
| Comp. Ex. 37 | A | A | C |
| Comp. Ex. 38 | A | A | C |
| Comp. Ex. 39 | A | A | C |
| Comp. Ex. 40 | A | A | C |
| Comp. Ex. 41 | A | A | C |
| Comp. Ex. 42 | A | A | C |
| Comp. Ex. 43 | A | A | C |
| Comp. Ex. 44 | A | A | C |
| Comp. Ex. 45 | A | A | C |
| Comp. Ex. 46 | A | A | C |
| Comp. Ex. 47 | A | A | C |
| Comp. Ex. 48 | A | A | C |
| Comp. Ex. 49 | A | A | C |
| Comp. Ex. 50 | A | A | C |

INDUSTRIAL APPLICABILITY

The inkjet treatment liquid of the present invention can be suitably used in various recording apparatuses by an inkjet recording method, such as inkjet recording printers, facsimile machines, copiers, and printer/facsimile/copier complex apparatuses.

REFERENCE SIGNS LIST

1: inkjet treatment liquid
2: film thickness control roller
3: scoop roller
4: ink application roller
5: counter roller
6: recording medium
7: paper feed roller
8: paper feeding tray
10: paper feeding roller
11 to 16: recording medium feeding roller
17: recording medium
18: paper feeding roller
20: inkjet recording head
21: ink cartridge
22: carriage axis
23: carriage
31: recording medium guide
32, 33: recording medium feeding roller
34: recording medium return guide
35: paper feeding guide
A: treatment liquid-applying-operation section
B: start point of the record scanning section

The invention claimed is:
1. An inkjet treatment liquid, comprising:
a water-soluble coagulating agent;
a water-soluble organic solvent;
a fluorochemical surfactant;
a foam inhibitor; and
water,
wherein the foam inhibitor is a compound of formula (I):

$$HOR_1R_3C-[CH_2]_n-CR_2R_4OH \qquad (I),$$

wherein, in formula (I):
$R_1$ and $R_2$ are each independently an alkyl group comprising 3 to 6 carbon atoms;
$R_3$ and $R_4$ are each independently an alkyl group comprising 1 or 2 carbon atoms; and
n is an integer of 1 to 6, and
wherein the fluorochemical surfactant comprises a compound of formula (II):

$$Rf-Q-Z \qquad (II)$$

wherein, in formula (II):
Rf is a perfluoroalkyl group;
Q is a bonding group; and
Z is a hydrophilic group comprising $-(CH_2CH_2O)_n-$, $-COO^-$, $-SO_3^-$, $-SO_4^-$, or $-PO_4^-$, wherein n is an integer of 1 to 50,
wherein the water-soluble coagulating agent is a water-soluble aliphatic organic acid compound and the inkjet treatment liquid comprises a molar equivalent amount or higher of a water-soluble organic monoamine compound relative to an acid group contained in the water-soluble aliphatic organic acid compound,
wherein the water-soluble aliphatic organic acid compound is at least one selected from the group consisting of a compound of formulae (VII) to (IX):

wherein, in formula (VII):
$R_1$ is a hydrogen atom or a methyl group substituted by a carboxyl group; and
$R_2$ is a methyl group, a methyl group substituted by a carboxyl group, or a methyl group substituted by both a hydroxyl group and a carboxyl group, $$HO-\overset{O}{\underset{\|}{C}}-(CH_2)_n-\overset{O}{\underset{\|}{C}}-OH, \quad (VIII)$$

wherein, in formula (VIII), n is an integer of 0 to 4, and $$H_3C-(CH_2)_n-\overset{O}{\underset{\|}{C}}-OH, \quad (IX)$$

wherein, in formula (IX), n is an integer of 0 to 4,
and wherein the water-soluble organic monoamine compound is at least one compound selected from the group consisting of a compound of formulae (X) and (XI):

$$R_3-\overset{R_4}{\underset{|}{N}}-R_5, \quad (X)$$

wherein, in formula (X):
$R_3$, $R_4$, and $R_5$ are each independently a hydrogen atom, an alkoxy group comprising 1 to 4 carbon atoms, an alkyl group comprising 1 to 8 carbon atoms, a hydroxyethyl group or a hydroxypropyl group, with the proviso that a compound where all of $R_3$, $R_4$, and $R_5$ are hydrogen atoms is excluded, and $$H_2N-\overset{R_6}{\underset{R_7}{\overset{|}{C}}}-R_8, \quad (XI)$$

wherein, in formula (XI):
$R_6$ is a hydroxymethyl group;
$R_7$ is a methyl group, an ethyl group, or a hydroxymethyl group; and
$R_8$ is a hydrogen atom, an alkyl group comprising 1 to 4 carbon atoms, or a hydroxymethyl group.

2. The inkjet treatment liquid of claim 1, wherein the compound of formula (I) is at least one selected from the group consisting of 2,4,7,9-tetramethyldecane-4,7-diol and 2,5,8,11-tetramethyldodecane-5,8-diol.

3. The inkjet treatment liquid of claim 1, wherein the compound of formula (II) is at least one compound selected from the group consisting of a compound of formulae (III) to (VI):

$$C_NF_{2N+1}-CH_2CH(OH)CH_2-O-(CH_2CH_2O)_A-Y' \quad (III),$$

wherein, in formula (III):
N is an integer of 2 to 6;
A is an integer of 15 to 50; and
Y' is $-C_BH_{2B+1}$, where B is an integer of 11 to 19, or $-CH_2CH(OH)CH_2-C_DF_{2D+1}$, where D is an integer of 2 to 6, $$CF_3CF_2(CF_2CF_2)_J-CH_2CH_2O(CH_2CH_2O)_KH \quad (IV),$$

wherein, in formula (IV):
J is an integer of 0 to 10; and
K is an integer of 0 to 40, $$H-\left[O-CH_2-\underset{\underset{CH_3}{|}}{\overset{\overset{OCH_2-Rf}{|}}{\underset{|}{C}}}-CH_2\right]_n-O-\left[CH_2-CH_2-O\right]_m-\left[CH_2-\underset{\underset{CH_3}{|}}{\overset{\overset{OCH_2-Rf}{|}}{\underset{|}{C}}}-CH_2-O\right]_p-H, \quad (V)$$

wherein, in formula (V);
Rf is a perfluoroalkyl group;
m is an integer of 6 to 25; and
n and p are each independently an integer of 1 to 6, and $$X^+\cdot Y^--\left[O-CH_2-\underset{\underset{CH_3}{|}}{\overset{\overset{OCH_2-Rf}{|}}{\underset{|}{C}}}-CH_2\right]_q-O-Y^-\cdot X^+, \quad (VI)$$

wherein, in formula (VI):
Rf is a perfluoroalkyl group;
$X^+$ is an ammonium group, a quaternary ammonium group, or an alkali metal;
$Y^-$ is $-COO^-$, $-SO_3^-$, $-SO_4^-$, or $-PO_4^-$; and
q is an integer of 1 to 8.

4. An inkjet recording apparatus, comprising:
a treatment liquid application unit configured to apply an inkjet treatment liquid to a recording medium; and
an image forming unit configured to eject an inkjet ink to the recording medium coated with the inkjet treatment liquid, so as to form an image,
wherein the inkjet treatment liquid comprises:
a water-soluble coagulating agent;
a water-soluble organic solvent;
a fluorochemical surfactant;
a foam inhibitor; and
water,
wherein the foam inhibitor is a compound of formula (I):

$$HOR_1R_3C-[CH_2]_n-CR_2R_4OH \quad (I),$$

wherein, in formula (I):
$R_1$ and $R_2$ are each independently an alkyl group comprising 3 to 6 carbon atoms;
$R_3$ and $R_4$ are each independently an alkyl group comprising 1 or 2 carbon atoms; and
n is an integer of 1 to 6, and wherein the fluorochemical surfactant comprises a compound of formula (II):

Rf-Q-Z   (II)

wherein, in formula (II):
Rf is a perfluoroalkyl group;
Q is a bonding group; and
Z is a hydrophilic group comprising —(CH$_2$CH$_2$O)$_n$—, —COO$^-$, —SO$_3^-$, —SO$_4^-$, or —PO$_4^-$, wherein n is an integer of 1 to 50, wherein the water-soluble coagulating agent is a water-soluble aliphatic organic acid compound and the inkjet treatment liquid comprises a molar equivalent amount or higher of a water-soluble organic monoamine compound relative to an acid group contained in the water-soluble aliphatic organic acid compound, wherein the water-soluble aliphatic organic acid compound is at least one selected from the group consisting of a compound of formulae (VII) to (IX):

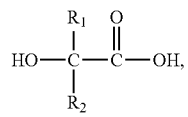   (VII)

wherein, in formula (VII):
R$_1$ is a hydrogen atom or a methyl group substituted by a carboxyl group; and
R$_2$ is a methyl group, a methyl group substituted by a carboxyl group, or a methyl group substituted by both a hydroxyl group and a carboxyl group,

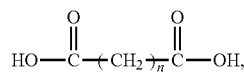   (VIII)

wherein, in formula (VIII), n is an integer of 0 to 4, and

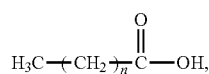   (IX)

wherein, in formula (IX), n is an integer of 0 to 4, and wherein the water-soluble organic monoamine compound is at least one compound selected from the group consisting of a compound of formulae (X) and (XI):

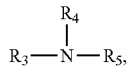   (X)

wherein, in formula (X):
R$_3$, R$_4$, and R$_5$ are each independently a hydrogen atom, an alkoxy group comprising 1 to 4 carbon atoms, an alkyl group comprising 1 to 8 carbon atoms, a hydroxyethyl group or a hydroxypropyl group, with the proviso that a compound where all of R$_3$, R$_4$, and R$_5$ are hydrogen atoms is excluded, and

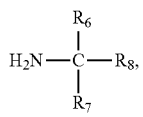   (XI)

wherein, in formula (XI):
R$_6$ is a hydroxymethyl group;
R$_7$ is a methyl group, an ethyl group, or a hydroxymethyl group; and
R$_8$ is a hydrogen atom, an alkyl group comprising 1 to 4 carbon atoms, or a hydroxymethyl group.

5. The inkjet recording apparatus of claim 4, wherein the compound of formula (I) is at least one selected from the group consisting of 2,4,7,9-tetramethyldecane-4,7-diol and 2,5,8,11-tetramethyldodecane-5,8-diol.

6. The inkjet recording apparatus of claim 4, wherein the compound of formula (II) is at least one compound selected from the group consisting of a compound of formulae (III) to (VI):

C$_N$F$_{2N+1}$—CH$_2$CH(OH)CH$_2$—O—(CH$_2$CH$_2$O)$_A$—Y'   (III), wherein, in formula (III):
N is an integer of 2 to 6;
A is an integer of 15 to 50; and
Y' is —C$_B$H$_{2B+1}$, where B is an integer of 11 to 19, or —CH$_2$CH(OH)CH$_2$—C$_D$F$_{2D+1}$,
where D is an integer of 2 to 6,

CF$_3$CF$_2$(CF$_2$CF$_2$)$_J$—CH$_2$CH$_2$O(CH$_2$CH$_2$O)$_K$H   (IV), wherein, in formula (IV):
J is an integer of 0 to 10; and
K is an integer of 0 to 40,

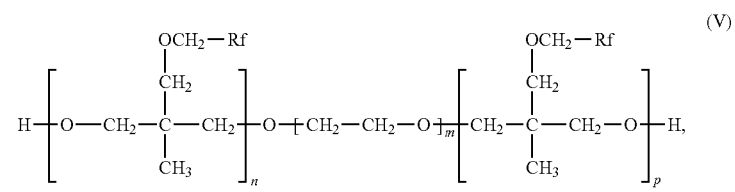   (V)

wherein, in formula (V):
Rf is a perfluoroalkyl group;
m is an integer of 6 to 25; and
n and p are each independently an integer of 1 to 6, and $$X^+ \cdot Y^- \left[ O-CH_2-\underset{\underset{CH_3}{|}}{\overset{\overset{OCH_2-Rf}{|}}{\underset{|}{C}}}-CH_2 \right]_q O-Y^- \cdot X^+, \quad (VI)$$

wherein, in formula (VI):
Rf is a perfluoroalkyl group;
$X^+$ is an ammonium group, a quaternary ammonium group, or an alkali metal;
$Y^-$ is $-COO^-$, $-SO_3^-$, $-SO_4^-$, or $-PO_4^-$; and
q is an integer of 1 to 8.

7. An inkjet recording method, the method comprising:
applying an inkjet treatment liquid to a recording medium; and
ejecting an inkjet ink to the recording medium coated with the inkjet treatment liquid, so as to form an image,
wherein the inkjet treatment liquid comprises:
a water-soluble coagulating agent;
a water-soluble organic solvent;
a fluorochemical surfactant;
a foam inhibitor; and
water,
wherein the foam inhibitor is a compound of formula (I):

$$HOR_1R_3C-[CH_2]_n-CR_2R_4OH \quad (I),$$

wherein, in formula (I):
$R_1$ and $R_2$ are each independently an alkyl group comprising 3 to 6 carbon atoms;
$R_3$ and $R_4$ are each independently an alkyl group comprising 1 or 2 carbon atoms; and
n is an integer of 1 to 6, and
wherein the fluorochemical surfactant comprises a compound of formula (II):

$$Rf-Q-Z \quad (II),$$

wherein, in formula (II):
Rf is a perfluoroalkyl group;
Q is a bonding group; and
Z is a hydrophilic group comprising $-(CH_2CH_2O)_n-$, $-COO^-$, $-SO_3^-$, $-SO_4^-$, or $-PO_4^-$, wherein n is an integer of 1 to 50,
wherein the water-soluble coagulating agent is a water-soluble aliphatic organic acid compound and the inkjet treatment liquid comprises a molar equivalent amount or higher of a water-soluble organic monoamine compound relative to an acid group contained in the water-soluble aliphatic organic acid compound,
wherein the water-soluble aliphatic organic acid compound is at least one selected from the group consisting of a compound of formulae (VII) to (IX):

$$HO-\underset{\underset{R_2}{|}}{\overset{\overset{R_1}{|}}{C}}-\overset{O}{\underset{||}{C}}-OH, \quad (VII)$$

wherein, in formula (VII):
$R_1$ is a hydrogen atom or a methyl group substituted by a carboxyl group; and
$R_2$ is a methyl group, a methyl group substituted by a carboxyl group, or a methyl group substituted by both a hydroxyl group and a carboxyl group, $$HO-\overset{O}{\underset{||}{C}}-(CH_2)_n-\overset{O}{\underset{||}{C}}-OH, \quad (VIII)$$

wherein, in formula (VIII), n is an integer of 0 to 4, and $$H_3C-(CH_2)_n-\overset{O}{\underset{||}{C}}-OH, \quad (IX)$$

wherein, in formula (IX), n is an integer of 0 to 4,
and wherein the water-soluble organic monoamine compound is at least one compound selected from the group consisting of a compound of formulae (X) and (XI):

$$R_3-\underset{\underset{}{|}}{\overset{\overset{R_4}{|}}{N}}-R_5, \quad (X)$$

wherein, in formula (X):
$R_3$, $R_4$, and $R_5$ are each independently a hydrogen atom, an alkoxy group comprising 1 to 4 carbon atoms, an alkyl group comprising 1 to 8 carbon atoms, a hydroxyethyl group or a hydroxypropyl group, with the proviso that a compound where all of $R_3$, $R_4$, and $R_5$ are hydrogen atoms is excluded, and $$H_2N-\underset{\underset{R_7}{|}}{\overset{\overset{R_6}{|}}{C}}-R_8, \quad (XI)$$

wherein, in formula (XI):
$R_6$ is a hydroxymethyl group;
$R_7$ is a methyl group, an ethyl group, or a hydroxymethyl group; and
$R_8$ is a hydrogen atom, an alkyl group comprising 1 to 4 carbon atoms, or a hydroxymethyl group.

8. The method of claim 7, wherein the compound of formula (I) is at least one selected from the group consisting of 2,4,7,9-tetramethyldecane-4,7-diol and 2,5,8,11-tetramethyldodecane-5,8-diol.

9. The method of claim 7, wherein the compound of formula (II) is at least one compound selected from the group consisting of a compound of formulae (III) to (VI):

$$C_NF_{2N+1}-CH_2CH(OH)CH_2-O-(CH_2CH_2O)_A-Y' \quad (III),$$

wherein, in formula (III):
- N is an integer of 2 to 6;
- A is an integer of 15 to 50; and
- Y' is $-C_BH_{2B+1}$, where B is an integer of 11 to 19, or $-CH_2CH(OH)CH_2-C_DF_{2D+1}$, where D is an integer of 2 to 6, $$CF_3CF_2(CF_2CF_2)_J-CH_2CH_2O(CH_2CH_2O)_KH \quad (IV),$$

wherein, in formula (IV):
- J is an integer of 0 to 10; and
- K is an integer of 0 to 40,

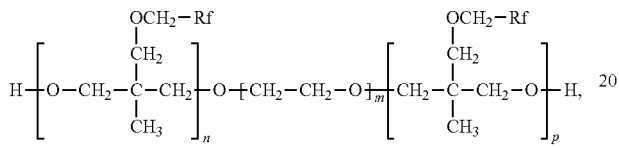

(V)

wherein, in formula (V):
- Rf is a perfluoroalkyl group;
- m is an integer of 6 to 25; and
- n and p are each independently an integer of 1 to 6, and

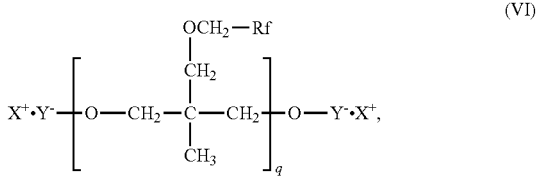

(VI)

wherein, in formula (VI):
- Rf is a perfluoroalkyl group;
- $X^+$ is an ammonium group, a quaternary ammonium group, or an alkali metal;
- $Y^-$ is $-COO^-$, $-SO_3^-$, $-SO_4^-$, or $-PO_4^-$; and
- q is an integer of 1 to 8.

* * * * *